(12) United States Patent
Sochen et al.

(10) Patent No.: US 9,465,103 B2
(45) Date of Patent: Oct. 11, 2016

(54) METHOD AND SYSTEM FOR TARGET DETECTION

(75) Inventors: Nir Asher Sochen, Tel-Aviv (IL); Yossef Ferdman, Hod-HaSharon (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 449 days.

(21) Appl. No.: 14/111,771

(22) PCT Filed: Apr. 11, 2012

(86) PCT No.: PCT/IB2012/051762
§ 371 (c)(1),
(2), (4) Date: Oct. 15, 2013

(87) PCT Pub. No.: WO2012/140578
PCT Pub. Date: Oct. 18, 2012

(65) Prior Publication Data
US 2014/0035776 A1 Feb. 6, 2014

(30) Foreign Application Priority Data

Apr. 14, 2011 (IL) .......................................... 212376

(51) Int. Cl.
*G01S 13/58* (2006.01)
*G01S 7/41* (2006.01)
*G01S 15/58* (2006.01)
*G01S 17/58* (2006.01)

(52) U.S. Cl.
CPC ................ *G01S 13/58* (2013.01); *G01S 7/412* (2013.01); *G01S 13/582* (2013.01); *G01S 15/582* (2013.01); *G01S 17/58* (2013.01)

(58) Field of Classification Search
CPC ...... G01S 13/58; G01S 7/412; G01S 15/582; G01S 17/58; G01S 13/582
See application file for complete search history.

(56) References Cited

U.S. PATENT DOCUMENTS 7,928,893 B2 * 4/2011 Baraniuk ................ G01S 7/295
342/179
8,471,758 B2 * 6/2013 Samuel ................... G01S 13/90
342/25 A

FOREIGN PATENT DOCUMENTS

WO WO 2012/140578 10/2012

OTHER PUBLICATIONS

International Preliminary Report on Patentability Dated Oct. 24, 2013 From the International Bureau of WIPO Re. Application No. PCT/IB2012/051762.

(Continued)

*Primary Examiner* — Matthew M Barker

(57) ABSTRACT

A method of detecting a physical target in a region-of-interest is disclosed. The method comprises: transmitting a pulse of radiation into the region-of-interest; receiving an echo signal from the region-of-interest; accessing a computer readable medium storing a dictionary defined over a plurality of dictionary atoms each describing a dictionary function corresponding to at least a time delay and a Doppler shift; calculating a coefficient for each dictionary function using the echo signal, thereby providing a plurality of coefficients, wherein a linear combination of all dictionary functions respectively weighted by the coefficients does not reconstruct the echo signal; and determining at least one of a range and a speed of the target based on the coefficients.

22 Claims, 20 Drawing Sheets
(16 of 20 Drawing Sheet(s) Filed in Color)

(56) References Cited

OTHER PUBLICATIONS

International Search Report and the Written Opinion Dated Aug. 17, 2012 From the International Searching Authority Re. Application No. PCT/IB2012/051762.

Baraniuk et al. "Compressive Radar Imaging", IEEE Radar Conference, Waltham, MA, USA, Apr. 17-20, 2007, p. 128-133, Apr. 2007.

Candès et al. "Enhancing Sparsity by Reweighted L1 Minimization", Journal of Fourier Analysis and Applications, 14(5-6): 877-905, 2008.

Donoho et al. "Uncertainty Principles and Ideal Atomic Decomposition", IEEE Transactions on Information Theory, XP011028077, 47(7): 2845-2862, Nov. 1, 2001. Abstract, p. 2845, col. 2, Lines 33-39.

Ender "On Compressive Sensing Applied to Radar", Signal Processing, 90: 1402-1414, 2010.

Herman et al. "High-Resolution Radar Via Compressed Sensing", IEEE Transactions on Signal Processing, 57(6): 2275-2284, Jun. 2009.

Potter et al. "Sparsity and Compressed Sensing in Radar Imaging. The Success and Accuracy of REmote Sensing With Radar Can Be Predicted From Reasonably Limited Samples of Radar Signals", Proceedings of the IEEE, 98(6): 1006-1020, Jun. 2010.

Shah et al. "Step-Frequency Radar With Compressive Sampling (SFR-CS)", 2010 IEEE International Conference on Acoustic Speech and Signal Processing, ICASSP 2010, Mar. 14-19, 2010, XP031697432, p. 1686-1689, Mar. 2010. Abstract, p. 1686, col. 2, Lines 6-12, 20-21, p. 1687, col. 1, Lines 7-8, 25-41, col. 2, Lines 18-29.

Yu et al. "MIMO Radar Using Compressive Sampling", IEEE Journal of Selected Topics in Signal Processing, XP011300235, 4(1): 146-163, Feb. 2010. Abstract.

* cited by examiner

METHOD AND SYSTEM FOR TARGET DETECTION

RELATED APPLICATIONS

This application is a National Phase of PCT Patent Application No. PCT/IB2012/051762 having International filing date of Apr. 11, 2012, which claims the benefit of priority of Israel Patent Application No. 212376 filed on Apr. 14, 2011. The contents of the above applications are incorporated herein by reference in their entirety.

FIELD AND BACKGROUND OF THE INVENTION

The present invention, in some embodiments thereof, relates to target detection and, more particularly, but not exclusively, to range-Doppler target detection.

A radar is a system that uses propagating waves to detect objects within a certain spatial volume. A radar system may be used to determine the range, altitude, direction, and/or speed of fixed objects, or objects that are moving through the spatial volume of interest.

The term "RADAR" was coined in 1941 as an acronym for Radio Detection and Ranging. This acronym, of American origin, replaced the previously used British abbreviation "RDF" (Radio Direction Finding). The term has since entered the English language as a generic word, "radar," that has lost its original capitalization.

A radar system transmits electromagnetic waves into the spatial volume. If and when an electromagnetic wave comes in contact with an object in space, the electromagnetic wave is reflected and scattered by the object. Thus, a reflected signal is propagated back toward the radar system. The radar system receives the reflected wave and detects the object. A radar system is typically configured to transmit many pulses into the spatial volume every second. These pulses are received by the radar system. By processing these pulses the radar system can detect the presence of the object and determine if the object is moving, and if moving, its speed and direction.

One way to measure the distance between the radar system and the target is to transmit a short pulse of radiation, and to measure the time elapsed for the reflection to return. The distance is one-half the product of round-trip time and the velocity of the signal. This concept was exploited already in certain early radars. Since the velocity of the signal is the velocity of light, the round-trip time is very short for terrestrial ranging.

Modern radar systems employ the Doppler effect for determining the speed of the object. Conventional pulse Doppler radar systems radiate a coherent pulse train that, when reflected by a target, returns signals that can provide data including the range of the target (the distance from the antenna), and its radial velocity with respect to the antenna. Many Doppler radar systems have been developed for many applications including airborne radar systems, surface-based systems and marine systems.

With the rapid advances in digital signal processing (DSP) technology, many modern radar systems, including pulse Doppler radar systems, digitize the return signals and utilize DSP for target detection and discrimination. DSP technology can improve the performance of a radar system while reducing its cost. Furthermore, the flexibility allowed by DSP systems can improve signal detection by enabling real-time adaptation of the receiver to various conditions.

A radar receives echo which includes a target reflection signal and other reflection signals (which are called clutter), e.g., from the ground. Pulse Doppler radar systems are used where moving targets are desired to be detected amidst an environment replete with clutter. Target detection processing, which is known as standard processing of a radar, is generally aimed for suppressing the clutter by discriminating the target reflection signal from the clutter. For moving targets, the discrimination is based on the moving speed of a target. Typically, a filtering process is performed on Doppler frequencies generated in relation to the moving speed of the target.

A typical example of this filtering process for the Doppler frequencies includes Fast Fourier Transform (FFT). It is recognized that in order to obtain a signal process gain, the transmission frequency at the time of receiving the signal should be coherent and transmission pulse intervals should be constant.

Known radar systems employ a mechanically rotated antenna. The beam radiated by the antenna is propagated into space along the antenna boresight. The spatial volume is, therefore, scanned by rotating the antenna, typically in a 360° sweep. A target search by the radar is typically performed by sequentially transmitting transmission pulses while rotating the antenna. Because the antenna is rotated, a time period for irradiating a target with the transmission radio waves is limited. The number of transmission pulses to be transmitted within this irradiation period is called a hit number.

The above-described Doppler filtering process is performed on transmission pulses within a time period called a coherent processing interval (CPI) having the hit number as an upper limit.

Also known are phased array radar antennas which include a plurality of antenna elements disposed in a two-dimensional array. These antenna elements are used for both transmission and detection of electromagnetic energy in an alternating fashion. A phased array radar system does not require moving parts, but may have them. For example, a planar array may be rotated mechanically to cover a required azimuthal range. However, a phased array radar does not require mechanical steering; it can be steered through phase shifting, or time delaying, signals to the various elements. A phased array radar beam is emitted by the plurality of elements using a principle known as superposition whereby the waves emitted by each element in the phase array are combined. The amplitudes and phases of the waves constructively and destructively interfere with each other to create a composite radar beam having a predetermined radiation pattern. By continuously varying the amplitudes and phases of the waves being emitted from the various elements of the array, the composite radar beam may be pointed in a certain direction, or be made to scan back and forth (in azimuth) or up and down (in elevation). Thus, a phased array antenna propagates a single beam into the spatial volume and the reflected return signals are received by all of the elements in the phased array. Accordingly, a phased array radar system may be viewed as a Single-Input Multiple Output (SIMO) system because the antenna array transmits a single composite radar beam and the reflected signal is received by all of the elements in the phase array.

Another type of radar system is the so called Multiple-Input Multiple-Output (MIMO) radar system. A MIMO radar system employs multiple independent transmitters and multiple receivers that are configured to take advantage of the geometry of the transmit and receive locations to increase target resolution. In some MIMO radar systems, each transmitter employs an omni-directional antenna having a low gain. In such systems a desired signal to noise ratio (SNR) on a given target can be achieved using a longer coherent integration time, resulting in enhanced Doppler resolution. The multiple transmitter elements in a MIMO radar system transmit orthogonal waveforms. Having each transmitter direct an orthogonal signal into the search volume allows each receiver to distinguish the transmission source of a received reflected signal. On the receive side, each receiver element is configured to accommodate each orthogonal signal, typically by employing a matched filter for each orthogonal signal.

Also known is the use of Compressive Sensing (CS) instead of matched filter [Herman and Strohmer "High-Resolution Radar via Compressed Sensing," IEEE Trans. on Signal Proc, Vol 57, No. 6, 2009].

CS has also been used in the context of step frequency waveform which requires transmission of pulse train [Shah et al., "Step-Frequency Radar with Compressive Sampling (SFR-CS)", in Proc. ICASSP 2010, 2010], and in MIMO radar, wherein the antenna array elements transmit and receives uncorrelated waveforms [Yu et al., "MIMO Radar Using Compressive Sampling," IEEE Journal on Selected Topics in Signal Proc., Vol. 4, no. 1, 2010].

It has been suggested that CS may reduce the sample rate and the number of antenna elements [Ender, J. H. G., "On compressive sensing applied to radar," Signal Processing. Vol. 90, Issue 5, 2010, pp. 1402-1414].

Additional background art includes Baraniuk and Steeghs, "Compressive radar imaging," in Proc. Radar Conf., 2007, pp. 129-133; and Potter et al., "Sparsity and compressed sensing in radar imaging," Proceedings of the IEEE, Special Issue on Applications of Compressed Sensing. Vol. 98, no. 6, June 2010.

SUMMARY OF THE INVENTION

According to an aspect of some embodiments of the present invention there is provided a method of detecting a physical target in a region-of-interest. The method comprises: transmitting a pulse of radiation into the region-of-interest; receiving an echo signal from the region-of-interest; accessing a computer readable medium storing a dictionary defined over a plurality of dictionary atoms each describing a dictionary function corresponding to at least a time delay and a Doppler shift; calculating a coefficient for each dictionary function using the echo signal, thereby providing a plurality of coefficients, wherein a linear combination of all dictionary functions respectively weighted by the coefficients does not reconstruct the echo signal; and determining at least one of a range and a speed of the target based on the coefficients.

According to some embodiments of the invention the method comprises calculating a time delay weight for each time delay, wherein the determination comprises selecting at least one time delay having a time delay weight satisfying a predetermined criterion, and selecting a range value for each selected time delay.

According to some embodiments of the invention the calculation of time delay weight comprises summing over at least a portion of coefficients corresponding to a respective time delay.

According to some embodiments of the invention the determination comprises: analyzing a subset of dictionary atoms corresponding to the at least one selected time delay; selecting from the subset at least one dictionary atom having a maximal correlation with the echo signal; and selecting a speed value based on a Doppler shift of each selected dictionary atom.

According to some embodiments of the invention the method comprises calculating a Doppler shift weight for each Doppler shift, wherein the determination comprises selecting at least one Doppler shift having a Doppler shift weight satisfying a predetermined criterion, and selecting a speed value for each selected Doppler shift.

According to some embodiments of the invention the calculation of Doppler shift weight comprises summing over at least a portion of coefficients corresponding to a respective Doppler shift.

According to some embodiments of the invention the determination comprises: analyzing a subset of dictionary atoms corresponding to the at least one selected Doppler shift; selecting from the subset at least one dictionary atom having a maximal with the echo signal; and selecting a range value based on a time delay of each selected dictionary atom.

According to some embodiments of the invention the method comprises, for each selected dictionary atom, subjecting a coefficient of the selected dictionary atom to a false detection test, and rejecting or accepting a range value and speed value associated with the selected dictionary atom based on the false detection test.

According to some embodiments of the invention the calculation and the determination is based on an echo signal corresponding to a single transmitted continuous wave pulse.

According to some embodiments of the invention the pulse is a generally rectangular continuous wave pulse of a generally fixed frequency band.

According to some embodiments of the invention the calculation and determination is based on an echo signal corresponding to a plurality of unsynchronized pulses featuring Frequency Division Multiplexing (FDM).

According to some embodiments of the invention the method comprises repeating the transmission, receiving, calculation and determination using a pulse having longer duration.

According to some embodiments of the invention the method comprises repeating the transmission, the receiving, the accessing, the calculation and the determination at a first repetition rate $N_1$ using pulses having a first duration, and at a second repetition rate $N_2$ using pulses having a second duration longer than the first duration, wherein $N_2$ differs from $N_1$. According to some embodiments of the present invention $N_2$ is smaller than $N_1$.

According to some embodiments of the invention the method comprises constructing the dictionary.

According to an aspect of some embodiments of the present invention there is provided a system for detecting a physical target using an echo signal received from a region-of-interest. The system comprises a data processor configured to access a computer readable medium storing a dictionary defined over a plurality of dictionary atoms each describing a dictionary function corresponding to at least a time delay and a Doppler shift, to calculate a coefficient for each dictionary function using the echo signal so as to provide a plurality of coefficients, wherein a linear combination of all dictionary functions respectively weighted by the coefficients does not reconstruct the echo signal, to determine at least one of a range and a speed of the target based on the coefficients and to generate an output indicative of the determination.

According to some embodiments of the invention the data processor is configured to calculate a time delay weight for each time delay, to select at least one time delay having a time delay weight satisfying a predetermined criterion, and to select a range value for each selected time delay.

According to some embodiments of the invention the data processor is configured to calculate the time delay weight by summing over at least a portion of coefficients corresponding to a respective time delay.

According to some embodiments of the invention the data processor is configured to analyze a subset of dictionary atoms corresponding to the at least one selected time delay, to select from the subset at least one dictionary atom having a maximal correlation with the echo signal, and to select a speed value based on a Doppler shift of each selected dictionary atom.

According to some embodiments of the invention the data processor is configured to calculate a Doppler shift weight for each Doppler shift, to select at least one Doppler shift having a Doppler shift weight satisfying a predetermined criterion, and to select a speed value for each selected Doppler shift.

According to some embodiments of the invention the data processor is configured to calculate the Doppler shift weight by summing over at least a portion of coefficients corresponding to a respective Doppler shift.

According to some embodiments of the invention the data processor is configured to analyze a subset of dictionary atoms corresponding to the at least one selected Doppler shift, to select from the subset at least one dictionary atom having a maximal with the echo signal, and to select a range value based on a time delay of each selected dictionary atom.

According to some embodiments of the invention the data processor is configured to apply, for each selected dictionary atom, a false detection test and to reject or accept a range value and speed value associated with the selected dictionary atom based on the false detection test.

According to some embodiments of the invention each dictionary atom describes a dictionary function corresponding to a time delay, a Doppler shift and at least one angle.

According to some embodiments of the invention the at least one angle comprises an azimuthal angle. According to some embodiments of the invention the at least one angle comprises an elevation angle.

According to some embodiments of the invention the method comprises determining at least one angle of the target based on the coefficients.

According to some embodiments of the invention the data processor is configured to determine at least one angle of the target based on the coefficients.

According to some embodiments of the invention the data processor is configured to perform the calculation and the determination based on an echo signal corresponding to a single transmitted continuous wave pulse.

According to some embodiments of the invention the pulse is a generally rectangular continuous wave pulse of a generally fixed frequency band.

According to some embodiments of the present invention the data processor is configured to construct the dictionary.

According to some embodiments of the invention the system comprises a radiation transmitting-receiving unit configured to transmit a pulse of radiation into the region-of-interest, and receiving the echo signal from the region-of-interest.

According to some embodiments of the invention the radiation transmitting-receiving unit employs a single rotating antenna, serving for transmitting pulse and receiving echo signal.

According to some embodiments of the invention the radiation transmitting-receiving unit employs a plurality of antennas, each separated from the others.

According to some embodiments of the invention the radiation transmitting-receiving unit employs a plurality of transmitter antennas and a plurality of receiver antennas, and wherein transmitter antennas and receiver antennas are not co-located and form a bistatic or multi-static system.

According to some embodiments of the present invention the radiation transmitting-receiving unit transmits a plurality of unsynchronized pulses featuring FDM, and the calculation and determination is based on an echo signal corresponding to said plurality of unsynchronized pulses.

According to some embodiments of the present invention a frequency bandwidth characterizing the pulse is less than $c/(2R_{Res})$, where c is a propagation speed of the pulse in the region-of-interest and $R_{Res}$ is a predetermined spatial resolution.

According to some embodiments of the present invention a characteristic time-on-target of the radiation is less than $1/f_{Res}$, where $f_{Res}$ is a predetermined spectral resolution.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a flowchart diagram of the method, according to various exemplary embodiments of the present invention;

FIG. 2 is a schematic illustration of a dictionary viewed as a two-dimensional grid;

FIG. 3 is a schematic illustration of a system for detecting a physical target, according to some embodiments of the present invention;

FIG. 4 is a schematic illustration of a block diagram of a radar receiver which includes a Digital Down-Converter (DDC);

FIG. 5 is a schematic illustration of a block diagram of a radar receiver which does not include a DDC;

FIG. 6A shows a signal containing echo from 3 targets and Gaussian noise, used in simulation experiments performed by the present inventors according to some embodiments of the present invention;

FIGS. 6B and 6C show solutions of a sparse minimization problem, using a basic (FIG. 6B) and modified (FIG. 6C) Iterative-Reweighed-Least-Squares, obtained according to some embodiments of the present invention;

FIGS. 6D and 6E show elements of a range detection solution expressed in a color coded representation over a two-dimensional range-Doppler grid (FIG. 6D) and the resultant range detection vector (FIG. 6E), as obtained according to some embodiments of the present invention;

FIGS. 6F and 6G show solution of a speed detection process as applied for the ranges shown in FIGS. 6D and 6E presented as a function of the correlation coefficient (FIG. 6F) and for a given range solution expressed in a color coded representation over a two-dimensional range-Doppler grid (FIG. 6G), as obtained according to some embodiments of the present invention;

Figure 9:
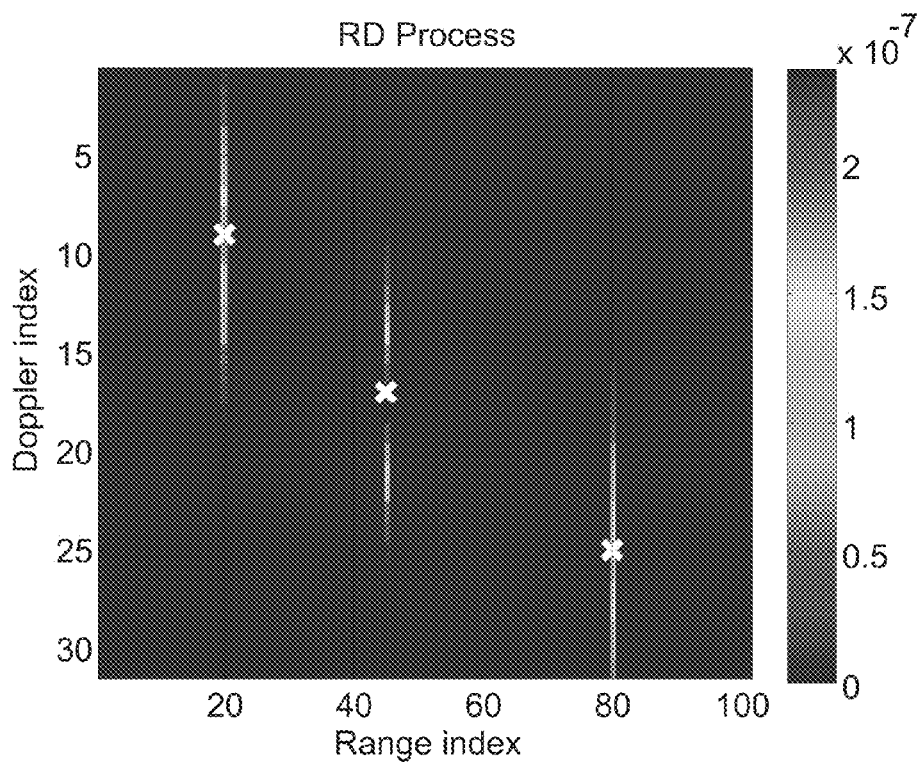
Figure 10A:
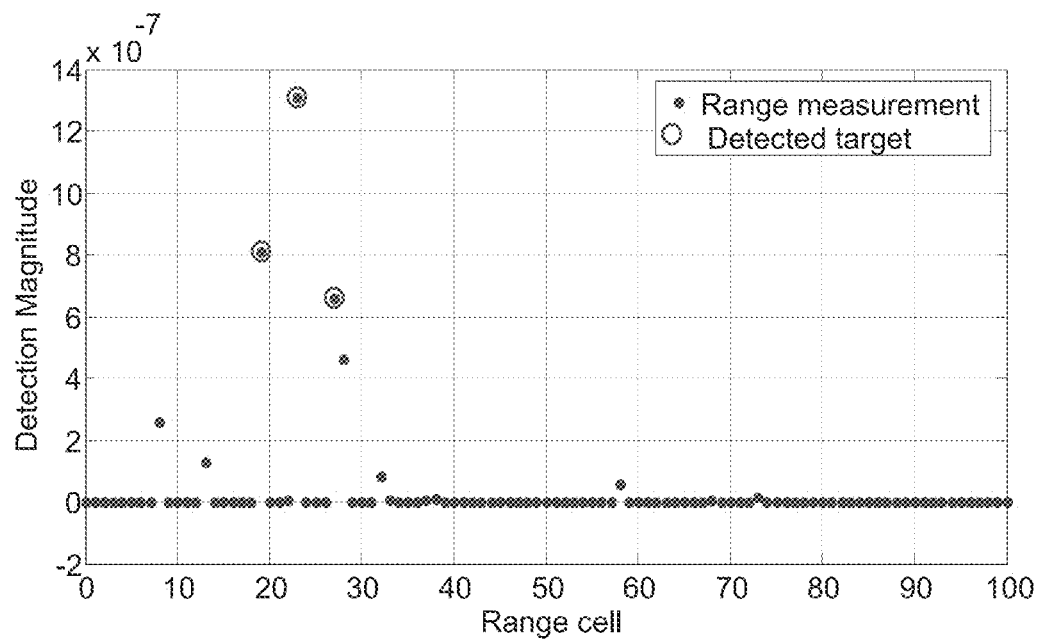
Figure 10B:
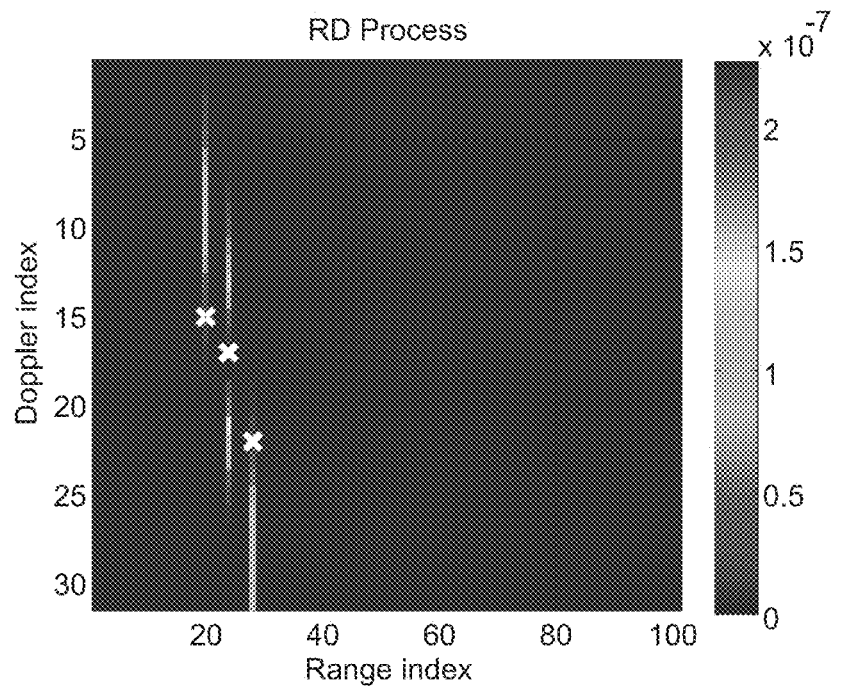
Figure 11A:
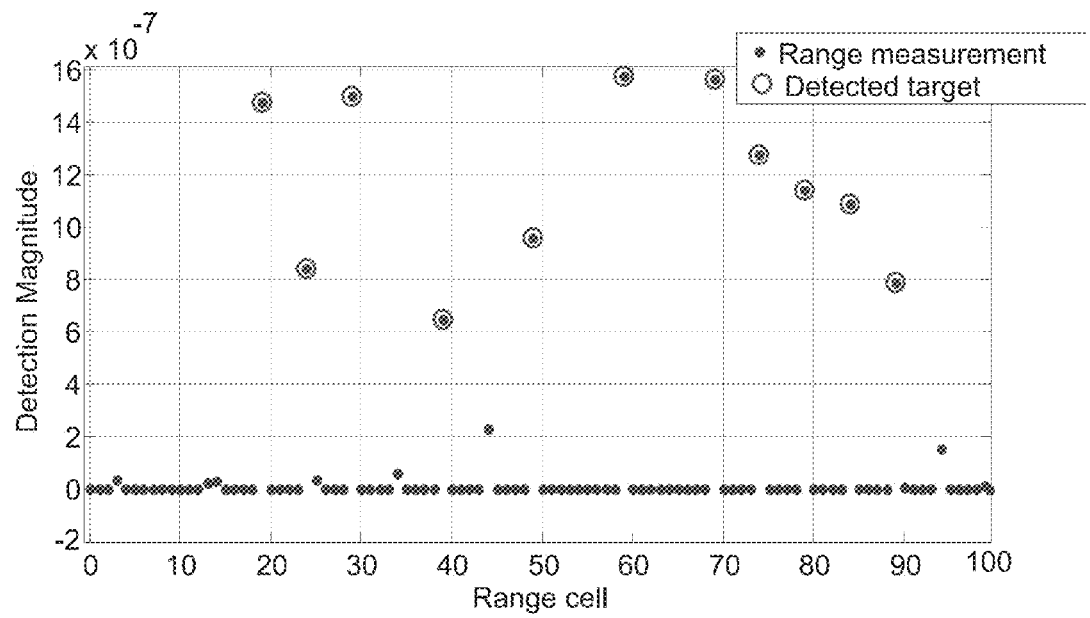
Figure 11B:
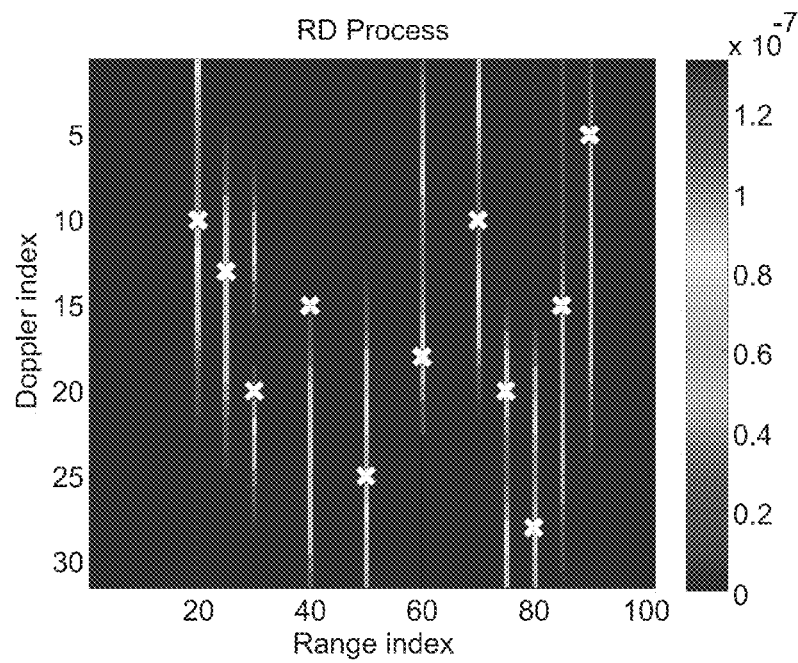
Figure 12A:
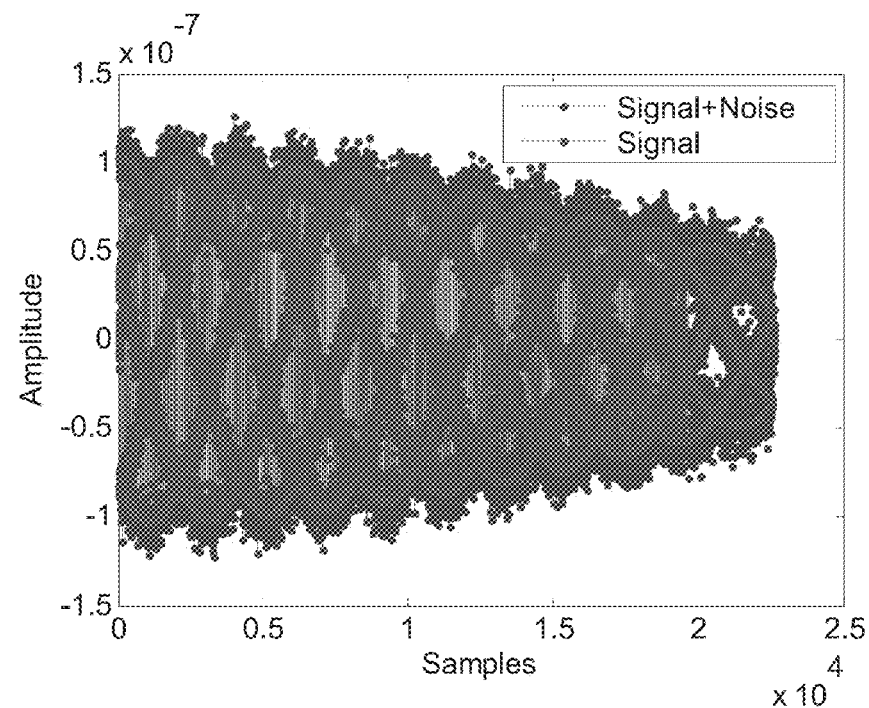
Figure 12B:
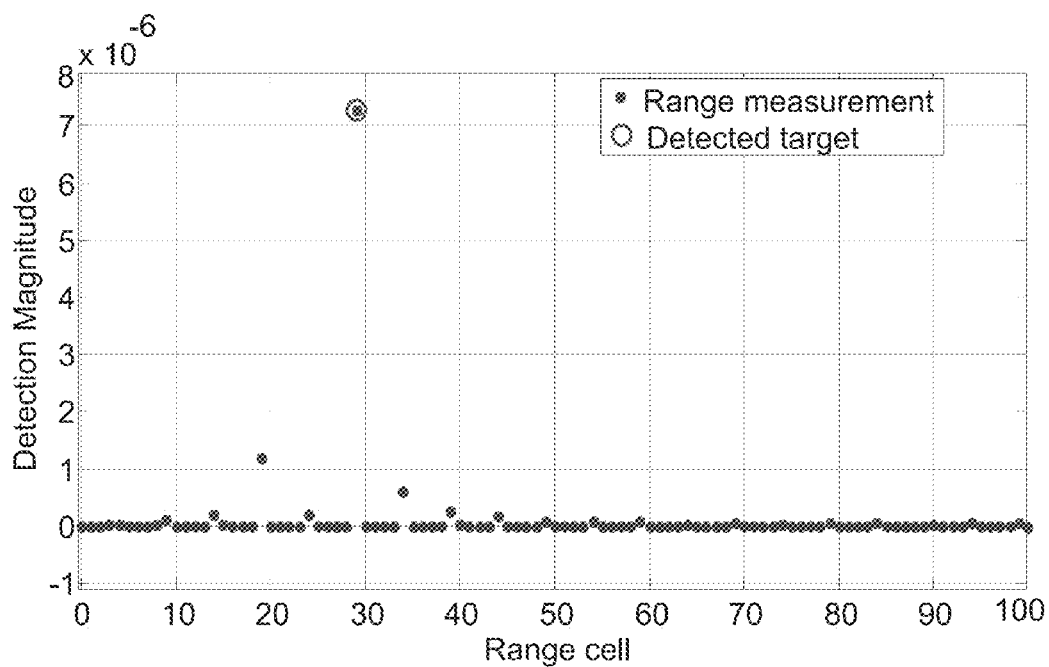
Figure 12C:
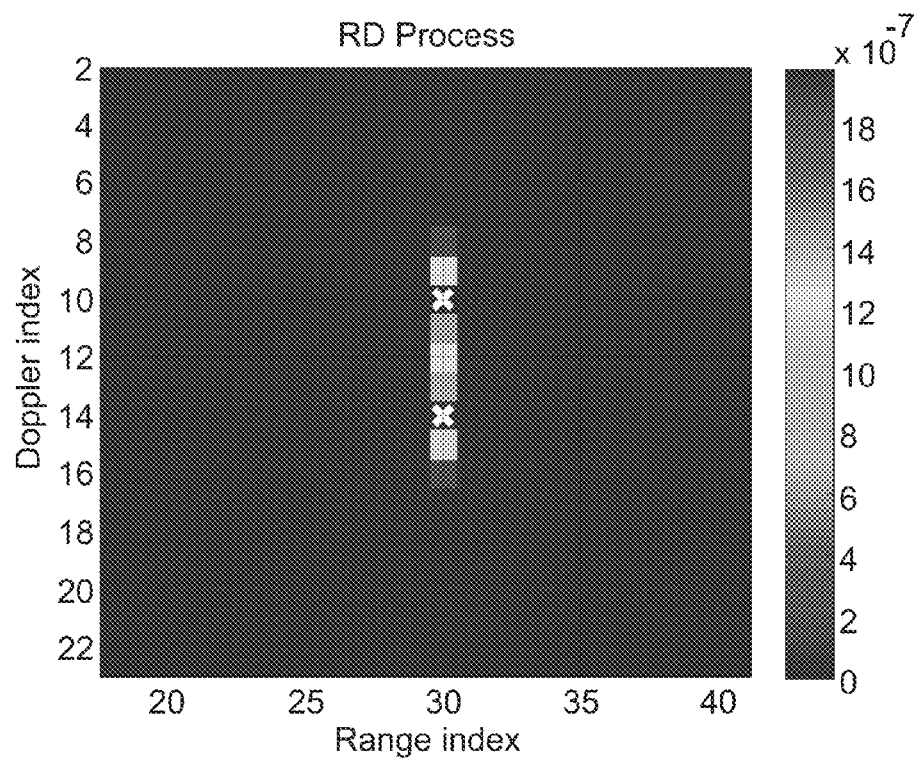
Figure 12D:
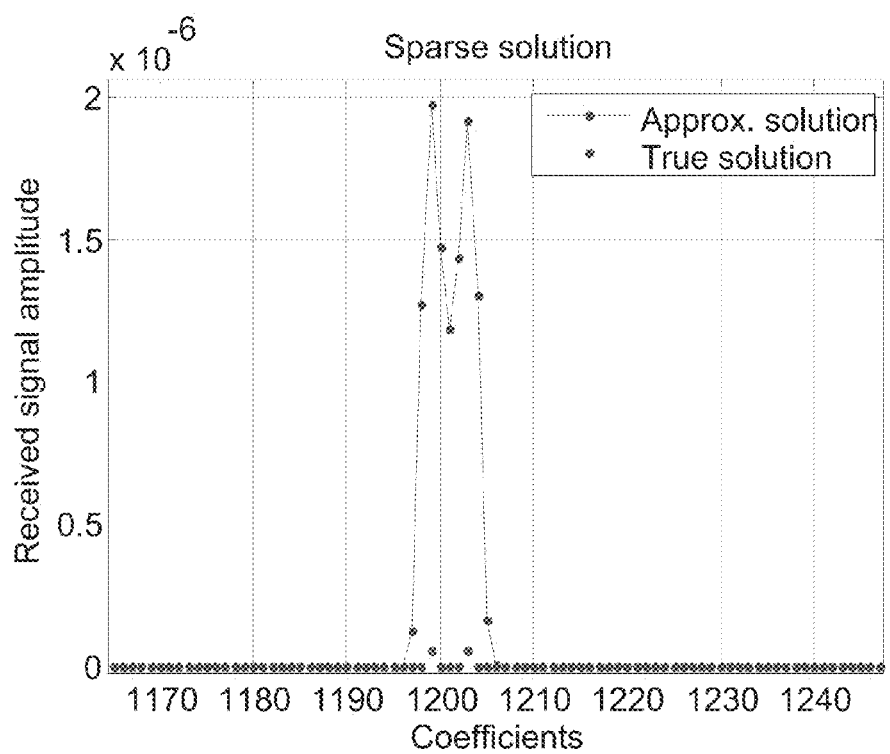

FIGS. 7A-D show results of simulation experiments performed according to some embodiments of the present invention using a signal that contains only Gaussian noise;

FIGS. 8A-D show results of simulation experiments performed according to some embodiments of the present invention using a 3 dB signal;

FIG. 9 show results of simulation experiments performed according to some embodiments of the present invention for a situation in which the range difference between targets are about 10 m;

FIGS. 10A and 10B show results of simulation experiments performed according to some embodiments of the present invention using a 0 dB signal and for a situation in which the range difference between targets is less than 5 m;

FIGS. 11A and 11B show results of simulation experiments performed according to some embodiments of the present invention using a 0 dB signal for a situation in which the number of targets is high and the range difference between targets is 5 m or 10 m;

FIGS. 12A-D show results of simulation experiments performed according to some embodiments of the present invention using a 13 dB signal for a situation in which there are two targets at the same range but different speeds; and FIGS. 13A-D show results obtained according to some embodiments of the present invention for range and speed detection from a signal echoed off a single target.

DESCRIPTION OF SPECIFIC EMBODIMENTS OF THE INVENTION

The present invention, in some embodiments thereof, relates to target detection and, more particularly, but not exclusively, to range-Doppler target detection.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Some embodiments of the present invention relate to a method suitable for detecting a physical target in a region-of-interest. One or more operations of the method can be executed by a data processor, which can be a general purpose computer or dedicated circuitry.

Computer programs implementing the method of this invention can commonly be distributed to users on a distribution medium such as, but not limited to, a floppy disk or CD-ROM. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this invention. All these operations are well-known to those skilled in the art of computer systems.

The method can be embodied in many forms. For example, it can be embodied in on a tangible medium such as a computer for performing the method steps. It can be embodied on a computer readable medium, comprising computer readable instructions for carrying out the method steps. It can also be embodied in electronic device having digital computer capabilities arranged to run the computer program on the tangible medium or execute the instruction on a computer readable medium.

Figure 1:
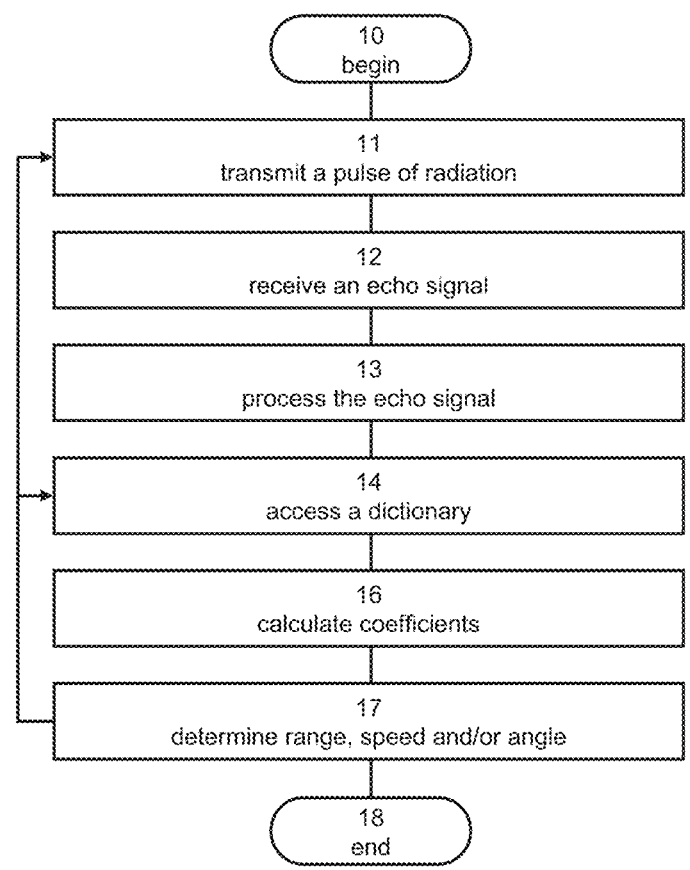

Referring now to the drawings, FIG. 1 is a flowchart diagram of the method, according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 10 and optionally and preferably continues to 11 at which a pulse of radiation is transmitted into the region-of-interest. In some embodiments of the invention a single pulse is transmitted, and in some embodiments of the invention a pulse train is transmitted. When a pulse train is transmitted the pulse train can be coherent or non-coherent.

The radiation can be of any type that can propagate in the region and be reflected from the surface of a target present in the region. Typically, the radiation is electromagnetic radiation at a wavelength suitable for radar systems. Representative examples include, without limitation, radiofrequency (RF) radiation, e.g., at wavelengths from about 1 mm to about 100 m, and electromagnetic radiation at optical frequencies, e.g., laser radiation. However, it is not intended to limit the scope of the present invention only to electromagnetic radiation or to any specific range of wavelengths. Other types of radiations, e.g., sound waves, particularly those useful for sonar systems are also contemplated.

The pulse can be transmitted using a single antenna or an antenna array, as desired. When a single antenna is used, the antenna is preferably directional and configured to transmit radiation waves that propagate outwardly as a beam within a defined cone. The directional antenna can be allowed to rotate horizontally and/or vertically, so that the emitted pulse is associated with a direction corresponding to the azimuthal and elevation angle the antenna assumes during the emission.

When an antenna array is used, the array includes a plurality of individual active antennas, each being spatially separated from the others. In an antenna array, the individual antennas can be directional or omni-directional as known in the art. The overall output power of the antenna array can be either a coherent or non-coherent addition of the radiation pulses from each of the individual active antennas. The present inventors found that the target can be detected even when the individual active antennas are non-coherent thereamongst.

Thus, in some embodiments of the invention the overall output power of the antenna array is a coherent addition of the radiation pulses from each of the individual active antennas, and in some embodiments of the invention the overall output power of the antenna array is a non-coherent addition of the radiation pulses from each of the individual active antennas.

The pulse can be of any type and shape. In various exemplary embodiments of the invention the pulse is devoid of frequency and phase modulation. The pulse can be, for example, a continuous wave (CW) pulse. In various exemplary embodiments of the invention the pulse is a generally rectangular CW pulse of a generally fixed frequency band.

The bandwidth of the pulse is optionally and preferably selected according to the desired spatial resolution of the detection. More specifically, denoting the desired range resolution by $R_{Res}$, the bandwidth B of the pulse is preferably less than $c/(2 R_{Res})$, where c is the propagation speed of the pulse in the region-of-interest.

The duration of the pulse is typically, but not necessarily, the reciprocal of the frequency band. Pulse duration values suitable for some embodiments of the present invention are from less than 1 μs (e.g., from about 0.4 μs) to a few ms (e.g., to about 10 ms). Other suitable pulse duration values include, without limitation, from about 10 to about 1 ms, or from about 50 μs to about 1 ms or from about 100 μs to about 500 μs.

In some embodiments of the present invention the total time duration of all the transmitted pulses is selected according to the desired spectral resolution of the detection. More specifically, denoting the desired spectral resolution by $f_{Res}$, the time-on-target is preferably less that $1/f_{Res}$.

As used herein, "time-on-target" (TOT) refers to the time interval allocated to collect echo from each beam direction. During the time-on-target, one pulse or one pulse train can be transmitted, and the time-on-target encompasses both the time interval during which the pulse or pulse train is transmitted and the time interval during which no radiation is emitted and the system awaits the echo. Thus, for detection based on a single pulse, the time-on-target encompasses the pulse duration and the time interval between successive pulses. For a train of p pulses, the total time-on-target equals the p·PRI, where PRI is the pulse repetition interval.

It is appreciated that according to the Doppler effect, a spectral resolution of $f_{Res}$ corresponds to a resolution of $\lambda f_{Res}/2$ in radial speed detection, where $\lambda$ is the wavelength of the transmitted pulse. Thus, the total time duration TOT can also be expressed in term of the resolution $V_{Res}$ in radial speed detection, e.g., TOT<$\lambda/(2 V_{Res})$.

Also contemplated are pulses suitable for Frequency Division Multiplexing (FDM). FDM is commonly employed as a multiplexing scheme in communication systems. In FDM, the signals are transmitted at the same time but at different frequencies. In various exemplary embodiments of the invention a plurality of unsynchronized pulses featuring FDM are transmitted, optionally and preferably at a bandwidth in the order of few KHz per pulse.

The method optionally and preferably continues to 12 at which an echo signal is received from the region-of-interest. The echo signal can be received by the same antenna(s) that transit the pulse or by a separate antenna or antenna array.

For example, in some embodiments of the present invention a single antenna both transits the pulse and receives the echo signal from the region-of-interest. In embodiments in which the antenna is directional, the received echo signal originates within the defined cone. In other embodiments, at least one antenna transmits the pulse but is not configured to detect the echo signal, and at least one antenna detect the echo signal but does not transmit the pulse. A representative and non-limiting example includes the use of two antennas, a transmitter antenna and a receiver antenna. Another example is the so called MIMO configuration having a plurality of transmitter antennas and another plurality of receiver antennas. Also contemplated are embodiments in which a SIMO configuration is employed wherein one antenna (or an array of coherent antennas) transmits the pulse and a plurality of antennas receive the echo signal.

The method optionally and preferably continues to 13 at which the echo signal is processed. The echo signal can be processed by any method known in the art of signal processing. Typically, the echo signal is preprocessed and optionally also digitized. For example, a synthetic signal from a local oscillator can be mixed with the echo signal to provide a mixed signal. Thereafter, the mixed signal can be filtered to provide a filtered signal of predetermined frequency bandwidth (e.g., a radiofrequency echo signal can be mixed and filtered to provide a filtered signal in the intermediate frequency range, e.g., from about 1 MHz to about 100 MHz). The filtered signal can then be digitized using an analog-to-digital device. The filtered signal can optionally, but not necessarily, be demodulated into an In-phase component (I) and a Quadrature component (Q), wherein the extraction of parameters is performed to one of these components, or separately to each of these components. Such processing is well-known to those skilled in the art of signal processing, and is found in many text books (see, for example, Richards, M. A. (2005) Fundamentals of Radar Signal Processing, McGraw-Hill.

In some embodiments of the present invention operations 11, 12 and 13 are not executed, and the method receives input pertaining to the round trip of the pulse of radiation in the region-of-interest. Such input can be provided, for example, from an external source, e.g., in the form of digital data as known in the art.

The method of the present embodiments is particularly useful when the number of targets in the region-of-interest is sufficiently small.

At 14 a computer readable medium storing a dictionary Φ is accessed. The dictionary is defined over a plurality of dictionary atoms $\phi_i$ (i=1, 2, 3, ...) each describing a dictionary function corresponding to parameters that characterize round trips of radiation in a region. The atom index i of dictionary atom $\phi_i$ can be equivalently expressed as a set of indices, each pointing to a different type of parameter.

As will be explained in more detailed below, the dictionary is used for target detection. Thus, the dictionary functions preferably correspond to parameters describing round trip of radiation in the region-of-interest. In various exemplary embodiments of the invention the parameters include at least the time delay and Doppler shift associated with the round trip of the radiation pulse.

As used herein "time delay" refers to the time interval during which the pulse propagates within the region-of-interest from the instance at which the pulse is emitted to the instance at which the echo signal is received.

As used herein "Doppler shift" refers to the difference between the frequency of the emitted pulse and the frequency of the received echo signal.

It is appreciated that the time delay correlates to the range to the target and the Doppler shift correlates to the radial speed of the target.

The parameters can also be some proxies of the time delay and/or Doppler shift. For example, instead of a time delay parameter, the method can use a range parameter corresponding to the time delay, and instead of a Doppler shift parameter, the method can use a radial speed parameter corresponding to the Doppler shift.

While the embodiments below are described with a particular emphasis to the time delay and Doppler shift parameters, it is to be understood that more detailed reference to these parameters is not to be interpreted as limiting the scope of the invention in any way, since any proxy of the time delay and/or Doppler shift can be used instead of those parameters.

In some embodiments of the present invention the parameters include one or more angles generally describing the propagation direction of the radiation pulse in the region-of-interest. The angles can include azimuthal angle and/or elevation angle, and can be extracted from steering information (e.g., antenna's orientation, phase or time shifting among individual antennas, etc.).

In various exemplary embodiments of the invention each dictionary function corresponds to at least a time delay and a Doppler shift, or some proxy thereof.

A representative example of a function of a dictionary atom is, without limitation:

$$\phi_i(t) = \cos[2\pi(f+f_{Di})(t-t_{di})]$$

where f is the frequency of the transmitted signal or some proxy thereof (e.g., following some mixing and filtration), and $f_{Di}$ and $t_{di}$ denote the Doppler shift and time delay associated with the ith dictionary atom.

It is appreciated that the total number of different Doppler shifts and the total number of different time delays that are defined in dictionary Φ are not necessarily equal. Generally, denoting the total number of different Doppler shifts by L and the total number of different time delays by J, there are N=J×L atoms in dictionary Φ. Thus, i can be an integer from 1 to N. One of ordinary skill in the art would know how to relate between the atom index i and the indices pointing to the Doppler shift and time delay. For example, denoting the time delay index by j (j=1, 2, ..., J) and the Doppler shift by l (l=1, 2, ..., L), a relation between the indices i, j and l can be written as i(j,l)=j+(l−1)J, or i(j,l)=l+(j−1)L.

Figure 2:
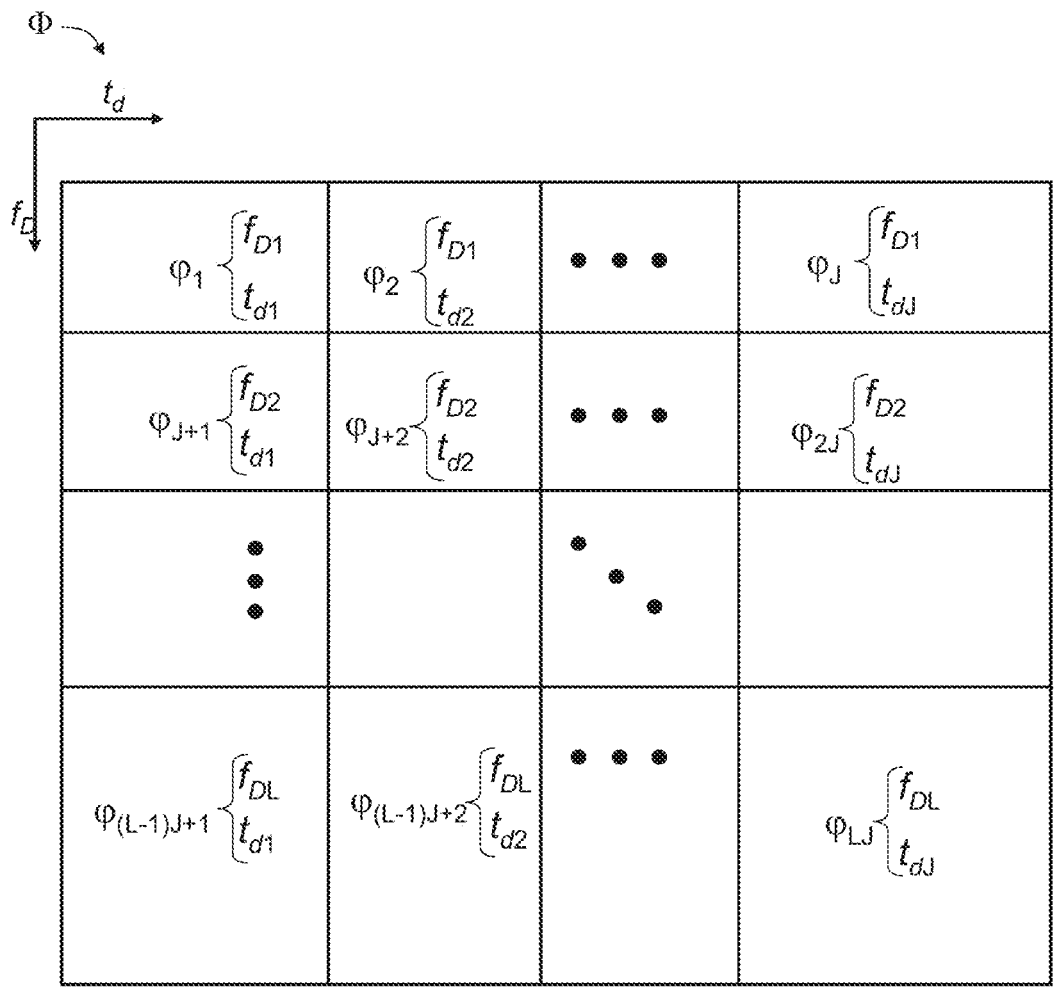

The dictionary Φ can therefore be viewed as a discrete grid in the parameter space. In the above example, Φ is a discrete grid in a two-dimensional space spanned by the time delay and Doppler shift. A visual representation of a dictionary Φ viewed as a two-dimensional grid is illustrated in FIG. 2, showing a plurality of dictionary atoms Φi, each describing a dictionary function corresponding to a different set of time delay and Doppler shift values. The grid is shown as a rectangular grid having a describe time axis $t_d$ and a describe frequency axis $f_D$. In this example, all dictionary atoms along a column describe dictionary functions corresponding to the same time delay, and all dictionary atoms along a row describe dictionary functions corresponding to the same Doppler shift.

It is appreciated that although the dictionary atoms are expressed in terms of time delay and Doppler shift values, each dictionary atom represents a two-dimensional cell defined over intervals in the vicinities of the respective time delay and Doppler shift values. Thus, an atom $\phi_i$ at a grid element defined for time delay $t_{dj}$ and Doppler shift $f_{Dl}$ can correspond to a time delay interval $t_{dj}-\Delta t_d/2 < t_{dj} < t_{dj}+\Delta t_d/2$ and a Doppler shift interval $f_{Dl}-\Delta f_D/2 < f_{Dl} \le f_{Dl}+\Delta f_D/2$. A typical value for $\Delta t_d$ is the grid constant defining the grid along the time axis, and typical value for $\Delta f_D$ is the grid constant defining the grid along the frequency axis. Representative examples for $\Delta t_d$ values suitable for the present embodiments, include, without limitation, any value from about 5 ns to about 1 µs, or from about 5 ns to about 500 ns, or from about 5 ns to about 100 ns, or from about 5 ns to about 50 ns. Representative examples for $\Delta f_D$ values suitable for the present embodiments, include, without limitation, any value from about 10 Hz to about 1 kHz, or from about 50 Hz to about 500 Hz, or from about 100 Hz to about 500 Hz. Other numerical values are not excluded from the scope of the present invention.

The dictionary atoms $\phi_i$ can describe functions that correspond to more types of parameters. For example, in some embodiments of the present invention the atoms $\phi_i$ describe functions that correspond to the time delay, the Doppler shift and one or more angle. In these embodiments, the dictionary Φ can be viewed as a discrete grid in a multi-dimensional space. Specifically, when the functions correspond to the time delay, Doppler shift and one angle (azimuthal or elevation angle), Φ can be viewed as a discrete grid in a three-dimensional space wherein each atom corresponds to a three-dimensional cell defined by a time delay interval, a Doppler shift interval and an angle interval, and when the functions correspond to the time delay, Doppler shift and two angles (azimuthal and elevation angles), Φ can be viewed as a discrete grid in a four-dimensional space wherein each atom corresponds to a three-dimensional cell defined by a time delay interval, a Doppler shift interval and two angle intervals.

In some embodiments of the present invention the dictionary atoms $\phi_i$ are distributed non-uniformly with respect to at least one of the parameters over which the dictionary is defined. This corresponds to a discrete grid having a non-uniform grid constant along at least one of its discrete axes. Thus, the time delay interval can be narrower for some discrete time-delay values and longer for some other discrete time-delay values, the Doppler shift interval can be narrower for some discrete Doppler shift values and longer for some other discrete Doppler shift values, and the angle interval(s)

can be narrower for some discrete angle values and longer for some other discrete angle values.

The maximal and minimal values of the time delay, Doppler shift and optionally angle(s) of the dictionary $\Phi$ are selected so as to encompass the boundaries of the region-of-interest and the expected target speeds within the region. Specifically, the region-of-interest is defined in terms of at least a range window $R_{Win}=[R_{min}, R_{max}]$, and a speed window $V_{Win}=[V_{min}, V_{max}]$, where $R_{min}$, $R_{max}$, $V_{min}$ and $V_{max}$ are, respectively, the minimal and maximal ranges and minimal and maximal expected target speeds in the region, and the invention dictionary $\Phi$ includes functions that correspond to each of $R_{min}$, $R_{max}$, $V_{min}$ and $V_{max}$, at least one range within the range window and at least one speed within the speed window. When the dictionary $\Phi$ includes functions that also correspond to angles, there are functions corresponding to the minimal and maximal angles within the region-of-interest.

The dictionary $\Phi$ can form a complete basis or, more preferably, it can be a redundant dictionary (also referred to in the literature as overcomplete dictionary). A redundant dictionary is a dictionary that includes more functions than the minimal number of base functions required to represent a signal.

The method of the present embodiments is useful particularly, but not exclusively, when the echo signal is sufficiently compressible.

As used herein, a "compressible signal" refers to a signal that can be approximated as a vector $\underline{y}$ which is decomposable using a dictionary $\Phi$ according to a respective vector of coefficients $\underline{\alpha}$, such that $\underline{y}$ equals the multiplication of $\Phi$ by $\underline{\alpha}$ wherein the coefficients in the vector $\alpha$, when ordered decreasingly according to their magnitude, obey a power law decay. Formally, denoting the coefficients in the vector $\alpha$, once ordered, by $\alpha_1, \alpha_2, \ldots, \alpha_N$, where $|\alpha_1| \geq |\alpha_2| \geq \ldots \geq |\alpha_N|$, the corresponding signal is compressible if, for any $n<m$, $|\alpha_n/\alpha_m|>(m/n)^s$, where $s \geq 1$.

Given an integer M, the M-term linear combination of elements which best approximate the vector $\underline{y}$ in an L2-sense is obtained by keeping the M largest terms in the expansion $y_M(t)=\Sigma_{n=0}^{M-1}\alpha_n\phi_n(t)$. If $\alpha$ obey a power law decay as defined above, then the error between $y_M$ and y also obeys a power-law $\|y_M-y\| \leq const \cdot M^{-(s-1)/2}$.

Referring now again to FIG. 1, the method continues to 16 at which, for each atom $\phi_i$, a coefficient $\alpha_i$ is calculated using the echo signal for the respective dictionary function. Each coefficient generally defines an estimated contribution of the respective dictionary function to the echo signal. Specifically, a positive coefficient indicates that the respective dictionary function is a component in the echo signal, namely that the echo signal includes the time delay and Doppler shift described by the dictionary function. A non-positive coefficient (or a coefficient below a certain threshold) indicates that the echo signal is devoid of the respective dictionary function. The value of the positive coefficients relates to the received power of the respective component of the echo signal. In some embodiments of the present invention, the coefficients are calculated under a non-negativity constraint. This can be done, for example, by replacing all negative coefficients by zeros.

Many techniques for calculating such coefficients can be employed. Generally, these techniques include, but are not limited to, a pursuit algorithm, e.g., Orthogonal Matching Pursuit, Matching Pursuit, Basis Pursuit, Order Recursive Matching Pursuit, Focal Underdetermined System Solver, or any combination or variation thereof. Such procedures are known in the art and found in, e.g., M. Elad, Sparse and Redundant Representations: From Theory to Applications in Signal and Image Processing, New York: Springer, 2010.

In various exemplary embodiments of the invention the coefficients $\alpha_i$ are calculated according to the Basis Pursuit approach using an algorithm known as Iterative-Reweighed-Least-Squares (IRLS), for example, as disclosed in Candès et al., 2008, Enhancing Sparsity by Reweighted L1 Minimization, Journal of Fourier Analysis and Applications, vol. 14, no. 5, pp. 877-905.

It is expected that during the life of a patent maturing from this application many relevant techniques for searching a dictionary will be developed and the scope of the term "searching" is intended to include all such new technologies a priori.

While the calculation of the coefficients is typically performed using techniques which attempt to obtain the coefficients that, once multiplied by the respective dictionary function, provide the best reconstruction of the echo signal, it was found by the inventors of the present invention that such reconstruction is not necessary for target detection. Thus, in various exemplary embodiments of the invention a linear combination $\Sigma_i\alpha_i\phi_i$ of all the dictionary functions $\phi_i$, respectively weighted by the calculated coefficients $\alpha_i$, does not reconstruct the echo signal y.

The difference between the echo signal y and the linear combination $\Sigma_i\alpha_i\phi_i$ can be quantified as a relative reconstruction error $E_{recon}$, which can be defined, e.g., according to the following equation:

$$E_{recon} = \frac{\left\| y - \sum_i \alpha_i \varphi_i \right\|_2}{\|y\|_2},$$

where the notation $\|X\|_2$ is to be understood as the l-2 norm of X. The summation $\Sigma_i\alpha_i\phi_i$ can include all coefficients or all non-zero coefficients. Alternatively, the summation can include only sufficiently large coefficients (e.g., coefficients that are above some threshold). For example, the summation can include only those coefficients corresponding to the range and speed detected as further detailed hereinbelow.

When the summation $\Sigma_i\alpha_i\phi_i$ includes all coefficients or all non-zero coefficients the value of $E_{recon}$ is optionally above $10^2$ or above $10^3$ or above $10^4$ or above $10^5$ or above $10^6$. In experiments performed by the present inventors, the relative reconstruction errors calculated using all non-zero coefficients were significantly above $10^5$ in all experiments.

When the summation $\Sigma_i\alpha_i\phi_i$ includes a portion of the non-zero coefficients the value of $E_{recon}$ is optionally at least 0.1 or at least 0.15, or at least 0.5 or at least 1 or at least 2. In some embodiments the value of $E_{recon}$ is more than 10.

The value of $E_{recon}$ can also vary with the duration of the transmitted pulse, wherein shorter pulses correspond to lower values of $E_{recon}$. For example, in experiments performed by the present inventors, the relative reconstruction errors calculated using only those coefficients corresponding to the range and speed as detected, were about 0.17 for pulse duration of 8 μs, about 1 for pulse duration of 15 μs, and about 22 for pulse duration of 300 μs.

The method continues to 17 at which the range and/or speed of the target is determined based on the matching. In embodiments in which the dictionary atoms also include angle information, an azimuthal and/or elevation angle to the target is also determined based on the matching.

In some embodiments of the present invention the determination is be done by selecting the best matched atom and determining the range and/or speed and optionally angles(s) using the time delay, Doppler shift and angle interval(s) of the best matched atom.

The determination can be done by weighing. In some embodiments, the method assigns a time-delay weight for each time delay. In the representative illustration of FIG. 2, this operation includes assigning a column-specific weight for each column. The time-delay weights are calculated by combining the coefficients that correspond to the respective time delay. This can be done using any mathematical procedure that provides a value to a collection of coefficients based on the individual values of the coefficients that belong to the collection. In some embodiments of the present invention a summation operation is employed wherein the method sums, for each time delay, over all the coefficients corresponding to that time delay, and uses the obtained sum as a time delay weight. In other embodiments, the method omits non-positive coefficients from the summation.

Once the time delay weights are calculated, the time delays for which the corresponding time delay weights satisfy a predetermined criterion or set of criteria are selected, and a range is determined based on each selected time delay.

For example, suppose that the weights are calculated by summation and that a maximal sum of coefficients is found for the kth time delay $t_{dk}$. The range r can then be selected based on the kth time delay interval $t_{dk}-\Delta t_d/2 < t_{dk} \leq t_{dk}+\Delta t_d/2$, e.g., by setting $r=ct_{dk}/2$, where c is the propagation speed of the pulse in the region-of-interest.

The criterion for selecting the time delays can be a predetermined threshold, wherein time delays having weights above the predetermined threshold are selected and other time delays are not selected. Alternatively, the criterion can be updated in adaptive manner, for example, using an algorithm known as constant false alarm ratio (CFAR). Such algorithms are known in the art and found, for example, in U.S. Published Application No. 20100296565.

Once the range is determined, the method can analyze a subset of dictionary atoms corresponding to the selected time delays (the kth time delay, in the above example), and select from the subset dictionary atoms having maximal correlation with the echo signal. The analysis optionally and preferably includes recalculating the coefficient of each atom in the subset. The recalculation can be done using the same procedure employed for calculating the coefficients in the original dictionary $\Phi$. The method can then select a speed value based on each the Doppler shift interval of the selected dictionary atoms.

The order of search can alternatively be reversed. In these embodiments the method assigns a Doppler shift weight for each Doppler shift. In the representative illustration of FIG. 2, this operation includes assigning a row-specific weight for each row. This can be done using any procedure, such as those described above with respect to the time-delay weights. Once the Doppler shift weights are calculated, the Doppler shifts for which the corresponding Doppler shift weights satisfy a predetermined criterion or set of criteria are selected, and a speed is determined based on each selected Doppler shift. Once the speed is determined, the method can analyze a subset of dictionary atoms corresponding to the selected Doppler shifts (e.g., by recalculating the coefficients as further detailed hereinabove), and select from the subset dictionary atoms having maximal correlation with the echo signal. The method can then select a range value based on each the time delay interval of the selected dictionary atoms.

The weighing technique of the present embodiments can be utilized for rejecting false detection, wherein targets that are identified according to the weight criterion with respect to one of the parameters are then subjected to a false detection test once the subset of atoms are analyzed. A target identified according to the weight criterion can be accepted or rejected based on the false detection test.

For example, suppose that the weighing technique includes assigning a weight to each time delay. Suppose further that three time delays, corresponding to three ranges $R_1$, $R_2$ and $R_3$, have passed the weight criterion (e.g., the corresponding weights are above a predetermined threshold). The method then defines a subset of atoms including only atoms that correspond to those three time delays (using the notations of FIG. 2, this correspond to a selection of 3 L atoms out of the JL atoms in the original dictionary). Once the subset is analyzed the method selects for each of ranges $R_1$, $R_2$ and $R_3$ (or equivalently the corresponding time delays), the atom that has maximal correlation with the echo signal. The method can also decide, for each of ranges $R_1$, $R_2$ and $R_3$, whether to accept or reject that range according to a false detection test applied to the atom that is selected from the subset. The test can include subjecting the coefficient of the selected atom to a thresholding procedure, wherein atoms whose coefficients are below a predetermined threshold are rejected.

Other search techniques over the dictionary are not excluded from the scope of the present invention.

In some embodiments of the invention the operations described above are performed for a received echo signal which corresponds to a single transmitted pulse. In some embodiments of the invention the operations described above are performed for a received echo signal which corresponds to a pulse train. The pulse train can be coherent or non-coherent.

Once the echo signal is analyzed and the range, speed and/or angle(s) is determined, the method optionally and preferably loops back to 11. In embodiments in which the method receives the parameters from an external source, the method, following the completion of operation 17, can receive another set of parameters and thereafter loop back to 14.

When the method loops back to 11, the subsequent transmitted pulse can be of the same duration or different duration. It was found by the present inventors that by controlling the duration of the pulse, the detection accuracy can be improved. Specifically, higher accuracy can be achieved with longer pulses or larger number of samples per pulse. On the other hand, other consideration may favor the use of relatively short pulses. Thus, according to some embodiments of the present invention the method repeats the above procedure at a rate $N_1$ using pulses of a shorter duration and at a rate $N_2$ using pulses with longer duration, wherein the rate $N_1$ is higher than the rate $N_2$. Representative example for $N_1$ is, without limitation, from about 0.1 Hz to about 5 Hz, and a representative example for the ratio $N_2/N_1$ is, without limitation from about 0.01 to about 0.99.

The dictionary used by the method can be stored in the computer readable medium in advance or it can be generated by the method. When the dictionary is stored in advance, several such dictionaries can be stored, each corresponding to a different range and/or speed windows and/or resolution, and the method can select one of the dictionaries for processing the echo signal. The method can also select a part of a previously stored dictionary and used the selected part as the dictionary $\Phi$. This embodiment is particularly useful when the previously stored dictionary has a resolution which is higher than the desired resolution and/or a range and/or speed windows that are wider than the region-of-interest.

When the dictionary is constructed by the method, the method can select the range window, speed window and resolution, and construct the dictionary, for example, by storing in the computer readable medium an array of functions (or an array of parameters defining the functions), wherein the boundaries of the array correspond to the range and speed windows, and the step size between successive array elements correspond to the resolution.

The method can re-build the dictionary (or re-select it, when several dictionaries are stored in advanced) before the transmission 11 of the pulse, or after the determination operation 17. The method can re-build or re-select once or several times, e.g., every one or more cycles of range, speed and/or angle determination.

In various exemplary embodiments of the invention the method selects the range and/or speed resolutions of the dictionary, based on previously analyzed echo signals. Thus, for example, the method can analyze the previous echo signals to initially determine the number of targets and speeds in the region-of-interest, and then select the resolutions based on these initial determination. Typically, the resolutions are selected such that there are no two adjacent cells in the dictionary that correspond to different targets. It was found by the present inventor that when the region-of-interest includes targets that are closer in their speed, it is advantageous to select a speed resolution such that the targets are separated by at least 4 Doppler shift intervals.

The initial determination can be done using a default dictionary with high resolution in both range and speed. Alternatively, initial determination can employ a Kalman filter or other types of target dynamic estimators.

The method ends at 18.

Figure 3:
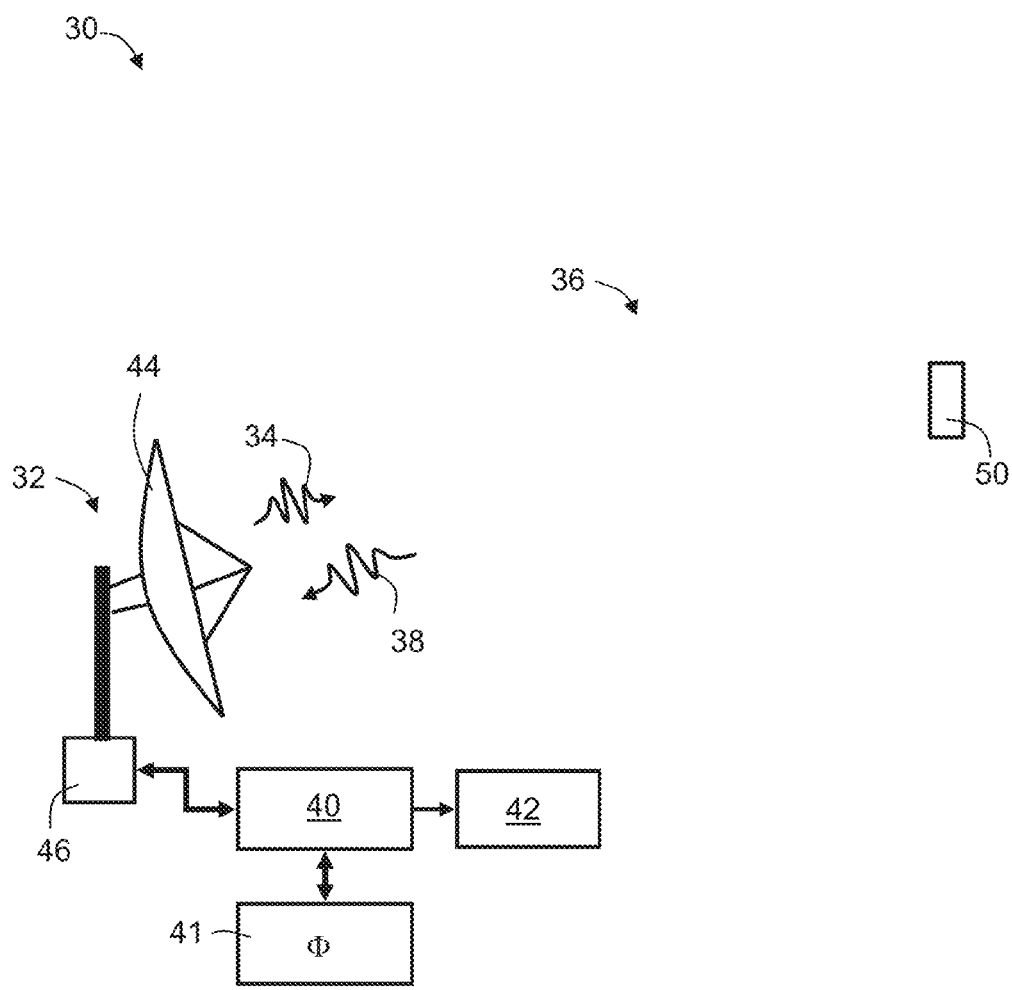

Reference is now made to FIG. 3 which is a schematic illustration of a system 30 for detecting a physical target 50, according to some embodiments of the present invention. System 30 can be positioned on the ground or on a vehicle.

System 30 optionally and preferably comprises a radiation transmitting-receiving unit 32 configured to transmit a pulse 34 of radiation into the region-of-interest 36, and receiving an echo signal 38 from region-of-interest 36. For clarity of presentation, pulse 34 and signal 38 are illustrated offset from each other, but this need not necessarily be the case, since the incoming signal 38 can return generally along the propagation path of the outgoing pulse 36. Unit 32 can comprise a single antenna 44 or an antenna array (not shown), as desired. When an antenna array is employed each antenna can be used as both a transmitter and a receiver. Alternatively at least one antenna can be used as a transmitter but not a receiver, and at least one antenna can be used as a receiver but not a transmitter, as further detailed hereinabove. The antenna or antennas of unit 32 can be directional or omni-directional, and it can be static or movable (e.g., rotatable).

In various exemplary embodiments of the invention system 30 comprises a signal processing module 46 which applies preprocessing to the received echo signal as further detailed hereinabove. Signal processing module 46 can be provided as a separate unit or it can be embodied in unit 32.

System 30 also comprises a data processor 40 configured to access a computer readable medium 41 storing a dictionary Φ as further detailed hereinabove. Data processor 40 receives a signal indicative of signal 38 from signal processing module 46. In some embodiments of the present invention signal processing module 46 is embodied in data processor 40. In these embodiments, data processor 40 receives signal 38 from unit 32, typically in the form of an electrical signal transmitted over an RF line or the like.

Data processor 40 searches the dictionary Φ for at least one dictionary atom matching echo signal 38, and determines the range, speed and/or angle(s) of the target based on the matching, as further detailed hereinabove. System 30 can also comprise an output unit 42, such as a display device or communication device, wherein data processor 40 generates an output indicative of determination and transmits it to output unit 42.

As used herein the terms "about" or "approximately" refer to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of means" "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Theoretical and Practical Considerations

Radar signals are typically, but not necessarily, narrow bandpass signals. A general form of a transmitted waveform in a conventional radar system contains amplitude and frequency modulation, and can be written as:

$$x(t)=A_t a(t)\cos[\omega_0 t+\theta(t)], \quad (1)$$

where $A_t$ is a constant amplitude, a(t) is the amplitude modulation (in this example, an on-off pulse is considered) of duration $t_p$, $\omega_0$ is the angular frequency of the waveform, and θ(0 is the phase modulation term. Without loss of generality, it is assumed that a(t) has unit amplitude. The received signal from a point target moving in a constant velocity at radial direction is:

$$\tilde{r}(t)=A_r a(t-t_d)\cos[(\omega_o+\omega_D)(t-t_d)+\theta(t-t_d)+\phi_0] \quad (2)$$

where $A_r$ is the received amplitude, $\phi_0$ is a random phase, $t_d$ is the time delay of the received signal relative to the transmission time of the waveform, so that the corresponding range is $R=ct_d/2$. Due to the Doppler affect, the frequency is shifted by $\omega_D$, which is related to the radial velocity v by $$\omega_D = \frac{2v}{\lambda}$$

where $\omega_D=2\pi f_D$.

Figure 4:
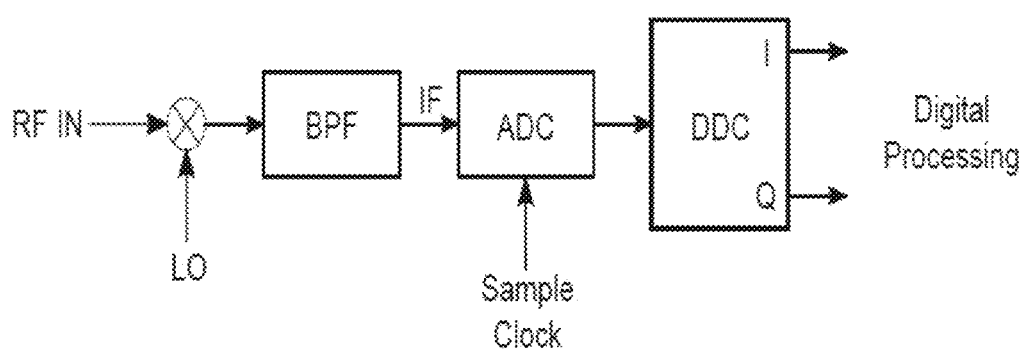
Figure 5:
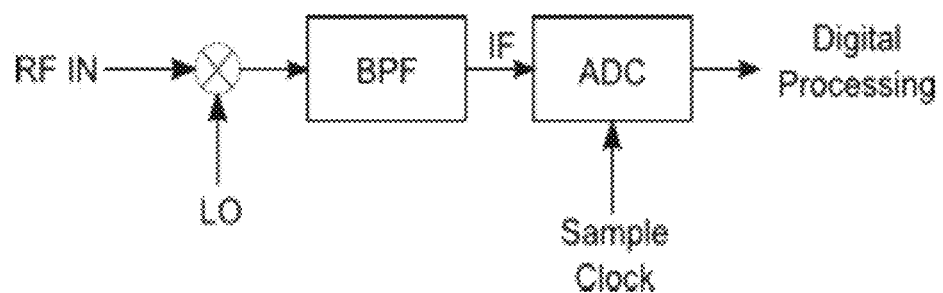

A schematic block diagram of a typical radar receiver is illustrated in FIG. 4. A local oscillator (LO) converts the signal to intermediate frequency (IF) that is convenient for filtering and processing operations. The band-pass filter (BPF) define the receiver bandwidth prior to the digitization performed by an Analog to digital converted (ADC). A digital down-converter (DDC) converts the digitized signal to a baseband complex signal which is represented in the I component and the Q component.

The I and Q components produce a quadratic model for radar signals, which is approximately analytic, and can therefore be written as:

$$r(t)=A_r a(t-t_d)e^{2\pi i f_D(t-t_d)}+w(t) \quad (3)$$

where w(t) is the receiver noise and the time variable t is discrete.

The amplitude of the received signal is obtained from a radar equation model. The radar model expresses the received signal power $P_r$ as a function of the antenna parameters and target parameters. The antenna parameters include the transmitted signal power $P_t$, gain G and wavelength λ, and the target parameters include the range R and the radar cross-section σ:

$$P_r = \frac{P_t G^2 \lambda^2 \sigma}{(4\pi)^3 R^4} \quad (4)$$

where the instantaneous power is related to the signal amplitude by $P_r=A_r^2/2$. The noise power is given by $$PN=k_B TBF \quad (5)$$

where, $k_B$ is the Boltzmann constant, T is the nominal temperature, B is the receiver bandwidth and F is the noise figure which is the ratio between the actual noise power at the output of the system and the minimum power.

The noise in the I and Q channels can be written as:

$$w_I, w_Q = N(0,\sqrt{P_N/2}),$$

so that the noise term is $w=w_I+iw_Q$ and the signal to noise ratio is $$SNR = \frac{P_r}{P_N}.$$

In many conventional radar systems, a linear frequency modulated pulse (LFM), also referred to as chirp, is employed. This type of transmitted pulse is typically processed using a pulse compression technique. Pulse compression allows transmission of long duration pulses, so that higher SNR and enhanced range measurement accuracy are achieved.

The range measurement accuracy is obtained since the LFM allows large bandwidth which implies small effective duration. A LFM pulse can be defined as follows:

$$F(t)=A_t a(t)\cos[2\pi f_0 t+\pi\beta t^2] \quad (6)$$

where $t_p$ is the pulsewidth, $f_0$ is the carrier frequency, $\beta=\pm B/t_p$ is the LFM slope and the amplitude modulation is $$a(t) = \begin{cases} 1, & 0 \le t \le t_p; \\ 0, & \text{Elsewhere.} \end{cases}$$

The phase modulation is typically $\phi(t)=\pi\beta t^2$ and the frequency modulation is defined according to the instantaneous frequency change. Note that each frequency within the bandwidth B is transmitted for an equal time.

$$f_i(t) = \frac{1}{2\pi}\frac{d\phi}{dt} = \beta t = \pm(B/t_p)t, 0 \le t \le t_p$$

The received signal, after quadrature demodulation, is $$r(t)=\tilde{A}_r s(t-t_d)e^{i2\pi f_D(t-t_d)}$$

where $\tilde{A}_r$ contains a constant phase (depends only on the time delay) and s(t) is the quadrature model of the transmitted signal, namely, $s(t)=a(t)\exp[i\phi(t)]$. The received signal is processed through matched filter which maximizes the SNR at some $t_m$. The impulse response of such filter is typically in the form:

$$h(t)=ks^*(t_m-t). \quad (7)$$

Filter causality requires that $t_m \geq t_p$. Choosing, for simplicity, $t_m=0$ and $k=1$, the following filter response is obtained:

$$y(t) = [r*h](t)$$
$$= \int_{-\infty}^{\infty} r(x)h^*(t-x)dx$$
$$= \tilde{A}_r \int_{-\infty}^{\infty} s(x-t_d)e^{i2\pi f_D(x-t_d)}s^*(x-t)dx$$
$$= \tilde{A}_r \int_{-\infty}^{\infty} s(y)e^{i2\pi f_D y}s^*(y-\tau)dy$$

where $\tau=t-t_d$. The integral is denoted by $\chi(\tau,f_D)$. This function describes the response of a filter matched to a moving target where the filter is design to match stationary target.

In conventional radar systems, a coherent train of pulses is transmitted, and the matched filter output from the mth pulse is:

$$y_m(t) = [r*h](t)$$
$$= \tilde{A}_r \int_{-\infty}^{\infty} s(x-mt_r-t_d)e^{i2\pi f_D(x-t_d)}s^*(x-t)dx$$
$$= \tilde{A}_r e^{i2\pi f_D mt_r} \int_{-\infty}^{\infty} s(y)e^{i2\pi f_D(y)}s^*(y-\tau+mt_r)dy$$
$$= \tilde{A}_r e^{i2\pi f_D mt_r} \chi(\tau-mt_r, f_D)$$

Since the pulse train is coherent, the entire pulse train is referenced to the same zero phase. The echo from the first pulse is received at $t_d$. Therefore, the subsequent echoes are sampled at $t=mt_r+t_d$, where $t_r$ is the pulse repetition interval (PRI) of the pulse train. Thus, the matched filter output is: $y[m]=\tilde{A}_r e^{i2\pi f_D mt_r}\chi(0,f_D)$. If the matched filter is constructed for a signal with Doppler frequency $\hat{f}_D$ then the output signal is $\tilde{A}_r e^{i2\pi f_D mt_r}\chi(0,f_D-\hat{f}_D)$.

A typical pulse Doppler radar system transmits a pulse train (dwell) according to a pulse repetition frequency (PRF), denotes $f_r$. The signal is filtered using a BPF to reject undesired spectral components, and is then shifted to a baseband and separated to I and Q components. Thereafter, the signal is processed using a matched filter and sampled every sampling interval $t_s$, which is considered as fast time sampling. For a chirp pulse compression, the affective pulse duration is smaller, and a range-pulse map is obtained.

The time separation between pulses $t_r$ which is considered as slow time sampling (CPI). Under an approximation known as the "stop and hop" approximation, it is assumed that the target velocity is unchanged during the pulse. For partial applications it can also be assumed that the target remains in the same range interval during the duration of the pulse.

A Discrete Fourier transform (DFT) of the slow time samples of echoes from a target is used for providing target's range-Doppler map. The maximal Doppler frequency that can be obtained without aliasing is $f_r=1/t_r$, and is referred to as the unambiguous Doppler frequency $f_{D,ua}$. There is also ambiguity in range when transmitting a pulse train. The unambiguous range is $R_{ua}=ct_r/2$. The Doppler resolution is $\Delta f_D=f_r/N_p$, where $N_p$ is the number of pulses, and the range resolution is $\Delta R=c/2B$.

The SNR (without considering various losses (L) which reduce the SNR) of the output signal for a coherent receiver that employs a matched filter for coherent pulse train transmission can be written as:

$$SNR = \frac{P_t t_p G^2 \lambda^2 \sigma N_p}{(4\pi)^3 kT_0 F_n} \quad (8)$$

Table 1 below provides an exemplary list of values for a typical radar system.

TABLE 1

| Parameter/variable | Symbol | Value |
|---|---|---|
| pulse duration | $t_p$ | 12 μs |
| PRF | fr | 3.8 kHz |
| transmission power | $P_t$ | 50 kW |
| gain | G | 2600 |
| transmission frequency | $f_c$ | 3 GHz |
| noise figure | F | 5 |
| Boltzman factor | $k_B T_0$ | $4 \cdot 10^{-21}$ |
| range | R | 60.012 km |
| radial velocity | v | 290 m/s |
| radar cross section | σ | 0.01 m² |
| fast time sampling interval | $t_s$ | 80 ns |
| SNR [EQ. (8)] | SNR | 20 dB. |

Using the values in Table 1, the number of pulses $N_2$ and unambiguous range $R_{ua}$ were calculated. The results are $N_p=127$ and $R_{ua}=39.5$ Km. Thus, the approximate target range is folded once: $R=nR_{ua}+R_{fold}\Rightarrow n=1$, $R_{fold}=20.53$ m.

In this example the matched filter is casual, so that $t_p$ is substituted for $t_m$ in EQ. (7). After the convolution, the peak is obtained at $t_d+t_p-nt_r$ corresponding to a range interval $$j = \frac{c(t_d + t_p - nt_r)}{2\Delta R_{rg}} = 1862.$$

The Doppler frequency was calculated using DFT with $N_p$ filters.

In this example, the unambiguous (radial) velocity is $$v_{ua} = \frac{\lambda}{2}f_r = 190 \text{ m/s},$$

so the velocity is folded once: $f_D=f_e+f_{D\,fold}$. The Doppler frequency of the target is $f_D=2v/\lambda=5.8$ KHz, therefore, the folded frequency is $f_D-f_r=2$ KHz. The frequency resolution is approximately 30 Hz, hence, the target appears in the Doppler shift interval $(f_D-f_r)/v_{res}=68$. Note that the Doppler resolution is $$\frac{f_r}{N_p} = 108.1081 \text{ Hz} \leftrightarrow \Delta v = 1.5 \text{ m/s}.$$

In the absence of prior estimation of target range and velocity, multiple dwells are required in order to resolve ambiguity in range and Doppler. In this example, if one should use three swells in order to resolve ambiguity, the total time on target would rise up to 100 ms.

The calculation provided in this example demonstrates that in conventional radar systems the Doppler shift is too small to be measured by a single pulse. For example, for a time on target of $t_p=20\mu$ and transmission frequency $f_c=3$ GHz, the Doppler shift corresponding to a target speed $v=200$ m/s is $2v/\lambda=4$ kHz. On the other hand, the Doppler resolution according to the Nyquist sampling theorem is $1/t_p=50$ kHz, so that a single pulse is insufficient for measuring the speed.

Example 2

Exemplary Target Detection

In this Example, a range and Doppler processing technique of a sparse echo signal is used for target detection according to some embodiments of the present invention.

The transmitted waveform in the present Example is a rectangular pulse, with duration $t_p$ and without frequency or phase modulation. Such pulse can be written as:

$$x(t)=a(t)\cos(2\pi f_0 t), \quad (9)$$

where $$a(t) = rect\left(\frac{t}{t_p}\right) = \begin{cases} 1, & 0 \le t \le t_p; \\ 0, & \text{elsewhere.} \end{cases} \quad (10)$$

FIG. 4B is a schematic illustration of a block diagram of a radar receiver which can be used according to the embodiments of the invention described in the present example. The receiver is similar to the receiver shown in FIG. 4, except that since Fourier transform is not employed, the conversion to base-band is not required and therefore the receiver does not include a digital down-converter.

The number of point targets from which the echo signal is received is denoted K. The echo signal prior to the digitization can be written as:

$$y(t) = \sum_{k\in I}\{\alpha_k a(t-t_{d_k})\cos[2\pi(f_{IF}+f_{D_k})(t-t_{d_k})+\phi_0]\}+w(t) \quad (10)$$

where $\phi_0$ is a random phase which can be resolved, $|I|=K$ and $\alpha_k$ is the amplitude of the received echo signal. The pair $(t_{d_k}, f_{D_k})$ is the time delay and Doppler shift, respectively, of the received echo signal. The Gaussian noise in the radar receiver is denoted $w(t)$. The discrete signal is defined at $t=nT$, where T is the sampling interval that characterizes the digitization.

In the sparse representation terminology y can be expressed in terms of a redundant dictionary $\Phi$:

$$y=\Phi\alpha+w_N, \quad (11)$$

where the vector $\alpha$ has K nonzero coefficients that correspond to the echoes of K targets in various ranges and radial velocities.

The atoms of $\Phi$ can have the form:

$$\Phi_{l,j}(t)=\cos\,[2\pi(f_{IF}+f_{D_l})(t-t_{d_j})] \quad (12)$$

The received signal y includes a superposition of echoes of targets in discrete ranges and Dopplers, and a noise component $w_N$.

It was found by the present Inventors that the problem of determining the range and Doppler of each target is equivalent to finding the support S of the solution of EQ. (11) In other words, the range and Doppler can be determined by calculating the indices of the nonzero elements of the vector of coefficients $\alpha$.

In the present Example, the dictionary is constructed for ranges corresponding to a time-delay window $[t_{min}, t_{max}]$ and speeds corresponding to a Doppler shift window $[f_{min}, f_{max}]$. The received signal is sampled from $t_{min}$ to $t_{max}+t_p$. The sampling rate $f_{sam}=1/T$ is defined according to some embodiments of the present invention using the Nyquist criteria, namely, $f_{sam}>+f_{max}+1/2t_p$. In the present example, the range resolution $\Delta R$ is a function of the sampling interval rate, $\Delta R=Tc/2$.

The dictionary atoms are defined at times $t=t_{min}+mT$, where $m=0, \ldots, \lfloor(t_{max}+t_p-t_{min})/T\rfloor$. The time delay grid is defined according to the sampling: $t_{d_j}=t_{min}+jT$, where $j=0, \ldots, \lfloor(t_{max}-t_{min})/T\rfloor \equiv J$.

The Doppler grid is defined as $f_{D_l}=f_{min}+l\Delta f_D$, $l=1, \ldots, L$ where $L=(f_{max}-f_{min})/\Delta f_D$. The value of $\Delta f_D$ can, in principle, have any value. Optionally and preferably, for longer pulses the value of $\Delta f_D$ is decreased, and vice versa.

In the present Example, a range determination precedes the speed determination. Both operations are based on an optimization algorithm. False targets that were detected during the range determination are omitted during the speed determination.

Following is a description of an optimization algorithm used in the present example.

The algorithm solves the so called basis pursuit denoising problem which can be formulated as:

$$(P_1^\varepsilon): \min_\alpha \|\alpha\|_1 \text{ subject to } \|y-\Phi\alpha\|_2 \le \varepsilon \quad (13)$$

In the present Example, the solution $\underline{\alpha}$ contains the received amplitude of each target. Hence, an non-negativity constraint can be employed. This problem can be considered as an optimization problem and can be solved using Lagrange multipliers $\mu$.

$$(Q_1^\mu): \min_\alpha \mu\|\alpha\|_1 + \frac{1}{2}\|y-\Phi\alpha\|_2^2. \quad (14)$$

$Q_i^\mu$ can be solved using an Iterative-Reweighed-Least-Squares (IRLS) algorithm. By replacing $\|\alpha\|_1$ with $\alpha^T A^{-1}\alpha$ where $A=\text{diag}(|\alpha|)$ the following quadratic optimization problem is obtained $$(M_k): \min_\alpha \mu\alpha^T A^{-1}\alpha + \frac{1}{2}\|y-\Phi\alpha\|_2^2 \quad (15)$$

The IRLS algorithm for solving $(Q_1^\mu)$ can include the following operations:

(i) Initialization: $k=0$, $\alpha_0=1$ (ii) Main Iteration: solve $(2\,\mu A_{k-1}^{-1}+\Phi^T\Phi)\alpha=\Phi^T y$ for $\alpha$ (iii) Update $\alpha_k$ and $A_k$: $\alpha_k=\alpha$, $A_k(j,j)=|\alpha_k(j)|+\epsilon$ (iv) Stopping Criterion: $k<k_{max}$ In an alternative embodiment, the IRLS algorithm is modified. In this embodiment the IRLS algorithm is the same as above except the update operation (iii) for $\alpha_k$ is replaced with $\alpha_k=\alpha^+$ where the "+" operator means that the negative elements of the vector $\alpha$ are set to zero.

The numerical values used in the experiments described below are summarized in Table 2.

TABLE 2

| Parameter/variable | Symbol | Value |
|---|---|---|
| Lagrange multiplier | μ | 0.00095 |
| Stopping threshold | $k_{max}$ | 15 |
| transmission power | $P_t$ | 50 kW |
| gain | G | 2600 |
| transmission frequency | $f_c$ | 3 GHz |
| noise figure | F | 5 |
| Boltzman factor | $k_B T_0$ | $4 \cdot 10^{-21}$ |
| Range window*) | $R_{Win}$ | (60, 60.200) km |
| Doppler window | $V_{Win}$ | (200, 800) m/s |
| radar cross section | σ | 0.01 m² |
| intermediate frequency | $f_{IF}$ | 60 MHz |
| sampling frequency | $f_{sam}$ | 75 MHz |
| grid constant along the time axis | $\Delta t_d$ | $1/f_{sam} = 0.013$ μs |
| grid constant along the frequency axis**) | $\Delta f_D$ | 300, 400 Hz |

*)in a the last example below the value of $R_{Win}$ was different
**)in a few examples below the value of $\Delta f_D$ was different The resolution in range and velocity were, therefore, $\Delta R = c/2f_{sam} = 2$ m and $\Delta v = \lambda \Delta f_D/2$, respectively.

The range $R_{Tgt}$ and speed $V_{Tgt}$ of the targets in the experiments that follows are given in terms of the respective time delay index j, and Doppler shift index l (see FIG. 2 and accompanying description), as follows:

$R_{Tgt} = R_{Win}(1) + (j-1)\Delta R$ $V_{Tgt} = V_{Win}(1) + (l-1)\Delta v$.

where $R_{Win}(1)$ and $V_{Win}(1)$ are the minimal range and minimal expected speed in the region-of-interest.

For example, for a radial velocity resolution $\Delta V = 20$ m/s and a target that is located at (j, l)=(20,10), the range is 60.038 km and the radial velocity is 380 m/s.

Figure 6A:
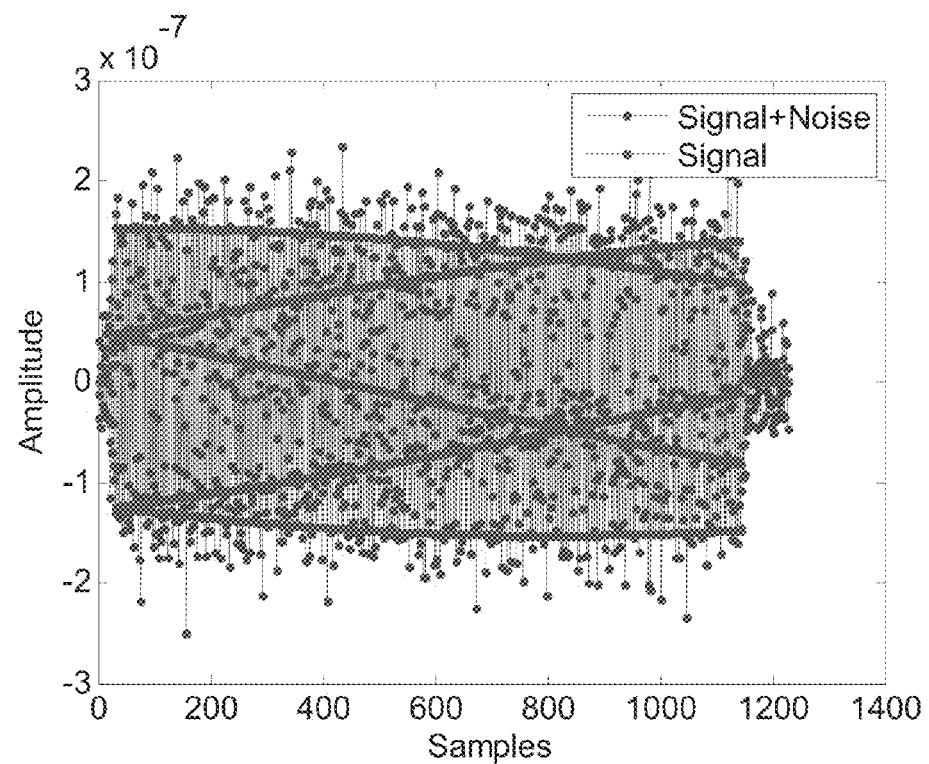
Figure 6B:
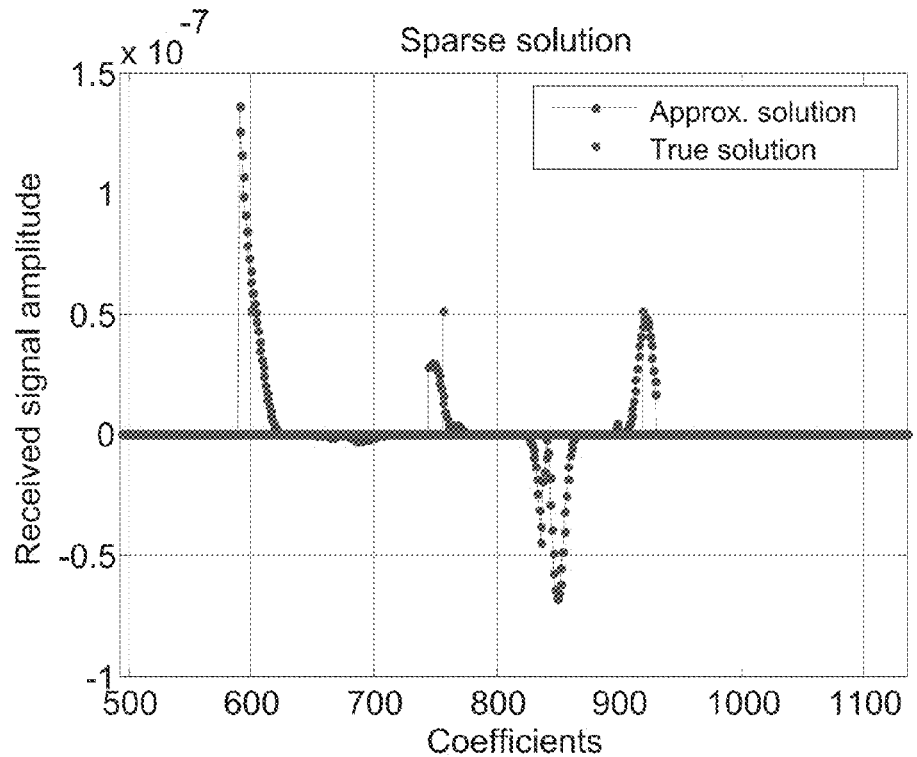
Figure 6C:
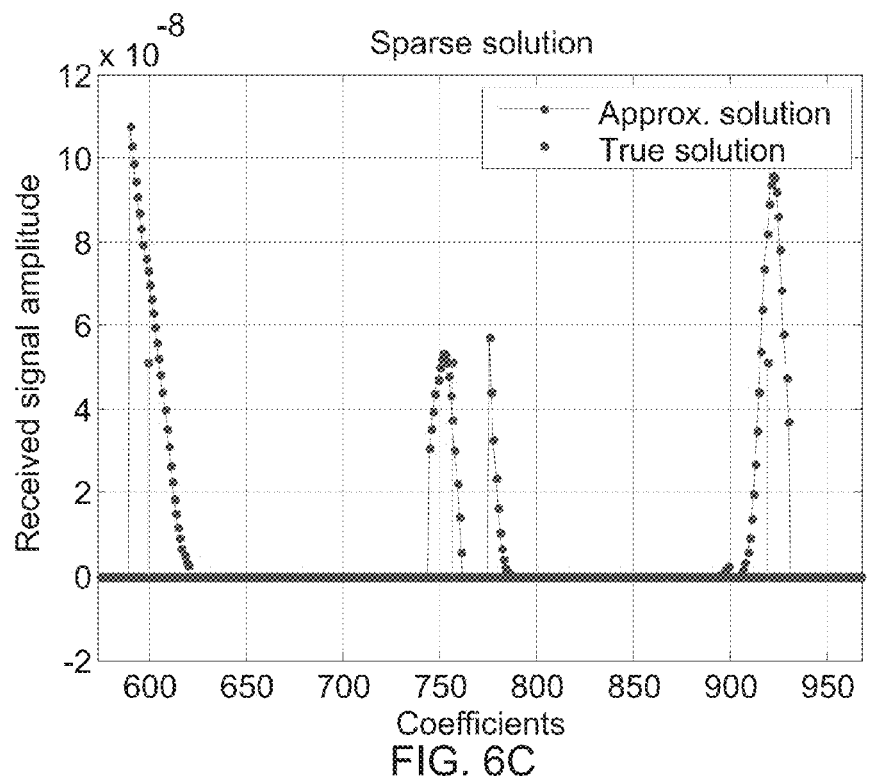

FIG. 6A shows a signal containing echo from 3 targets and Gaussian noise. The targets were located in the range and Doppler window in the following configuration: (j, l)=(20, 10), (25, 13), (30, 20), where the velocity resolution was $\Delta V = 20$ m/s. The pulse duration was 15 μs, corresponding to SNR of 0 dB±0.05 dB for each target echo, namely $SNR_i = P_i/N$, i=1, ..., (#Targets). FIGS. 6B and 6C show the solution of the sparse minimization problem, using the basic IRLS algorithm (FIG. 6B) and the modified IRLS algorithm (FIG. 6C). The solution obtained using the modified algorithm shows that the amplitudes of the solution coefficients is higher than those obtained by the basic algorithm.

The following results were obtained using the modified algorithm.

The elements of the solution vector with indices that correspond to the range Doppler atoms are denoted $\alpha = \{\alpha_{j,l}\}_{j=l=1}^{J,L}$. The Doppler coefficients were summed for every range to obtain a vector R, whose components are given by:

$$R_j = \sum_{l=1}^{L} \alpha_{j,l}, \, j = 1 \ldots J \quad (16)$$

The elements of the vector R reflect the existence or absence of a target in the corresponding range.

Figure 6D:
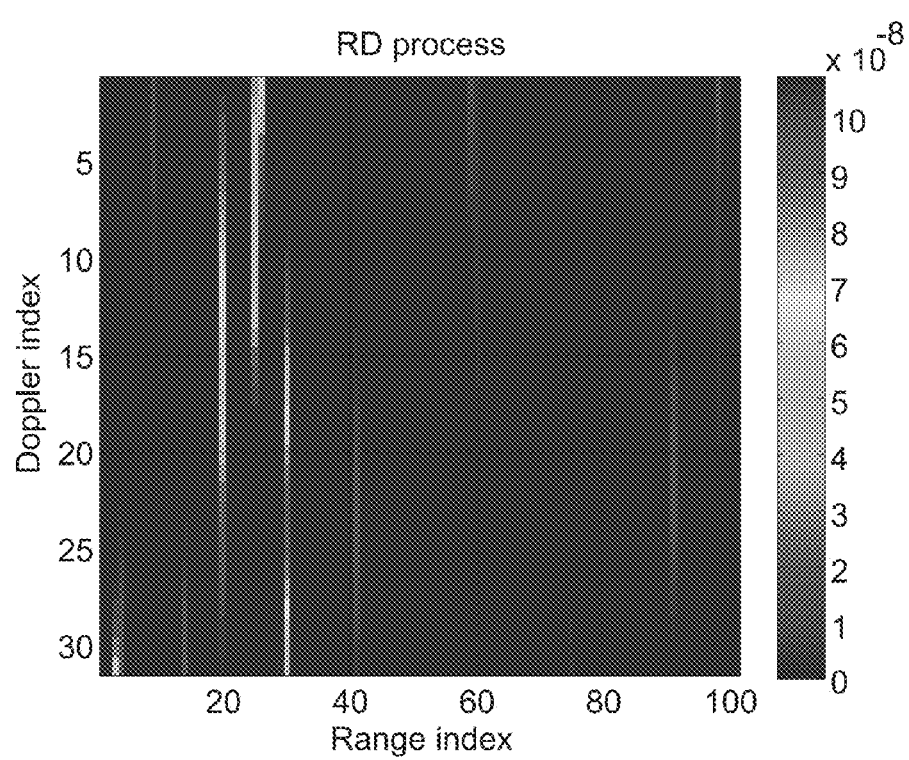
Figure 6E:
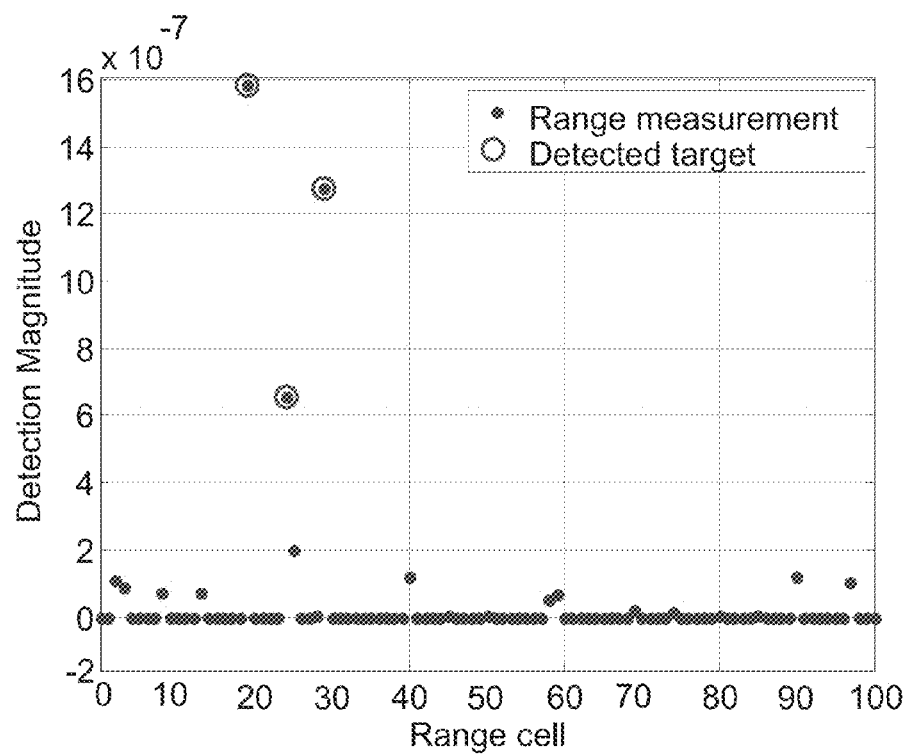

FIGS. 6D and 6E show elements of the solution $\alpha_{j,l}$ (FIG. 6D) and the resultant range detection vector (FIG. 6E). As shown, the elements of R that correspond to target in the region-of-interest are substantially higher than other elements of R. Applying a thresholding procedure at a value of, e.g., $5 \times 10^{-7}$, provides the ranges to the detected target.

Once the target ranges was known the dictionary was revised by keeping only a subset of atoms that correspond to the measured ranges. The optimization algorithm was then applied again using the revised dictionary.

Figure 6F:
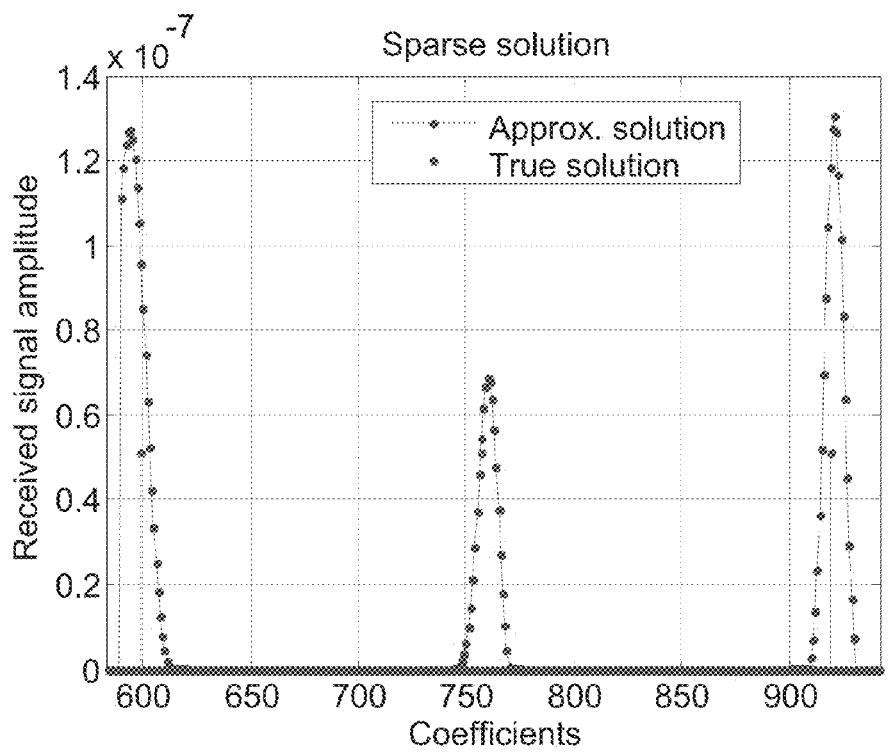
Figure 6G:
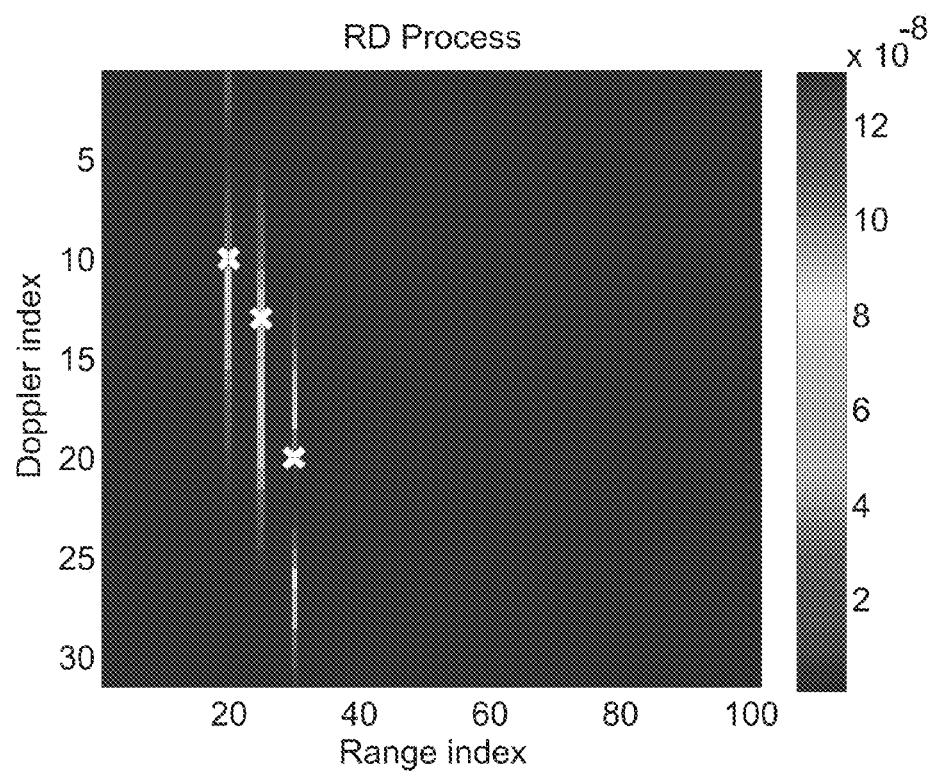

The solution vector is shown in FIG. 6F. The corresponding relative reconstruction error $E_{recon}$ was 1.09 (109%) when calculated using only coefficients corresponding to the range and speed as detected, and $6.19 \times 10^6$ when calculated using all non-zero coefficients. A range-Doppler map representation of the solution vector is shown in FIG. 6G. In FIG. 6G, the white cross marks the true target location on the range-Doppler map. The same white cross is also used in each of FIGS. 8D, 9, 10B, 11B, 12C and 13D described below.

The technique of the present embodiments was applied to a signal that contains only Gaussian noise. This purpose of this experiment was to investigate the ability of the technique of the present embodiments to overcome false positive detection.

Figure 7A:
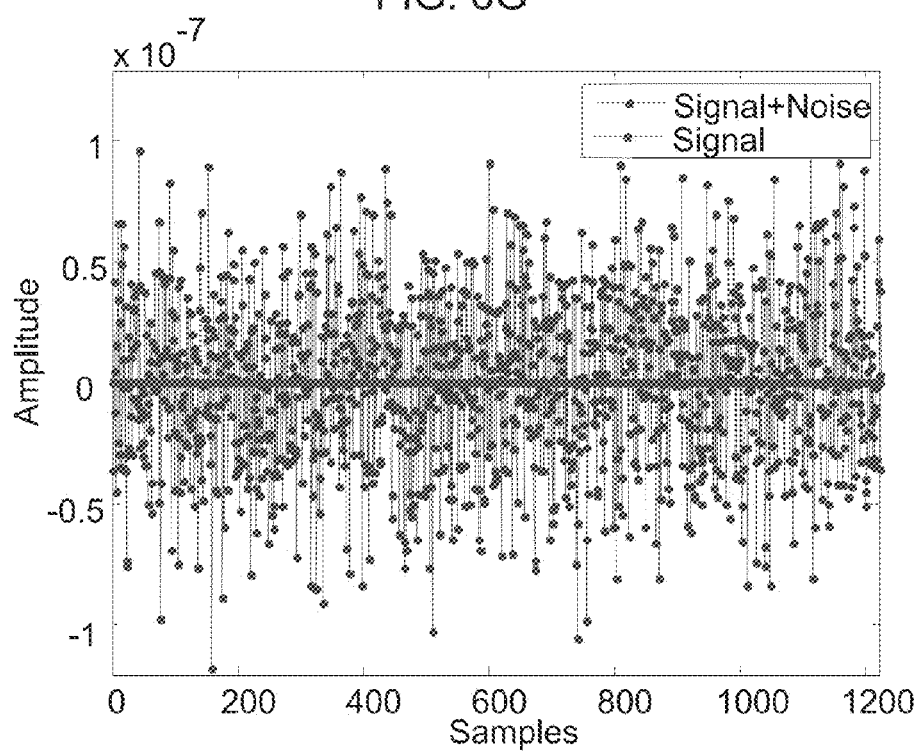
Figure 7B:
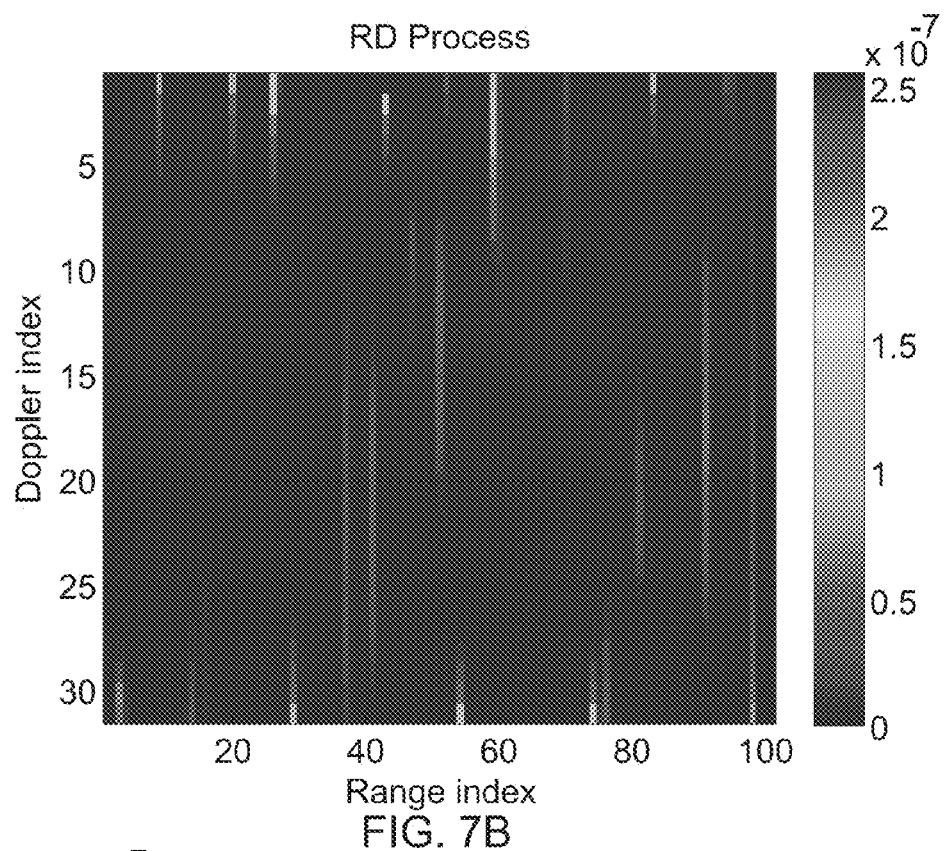
Figure 7C:
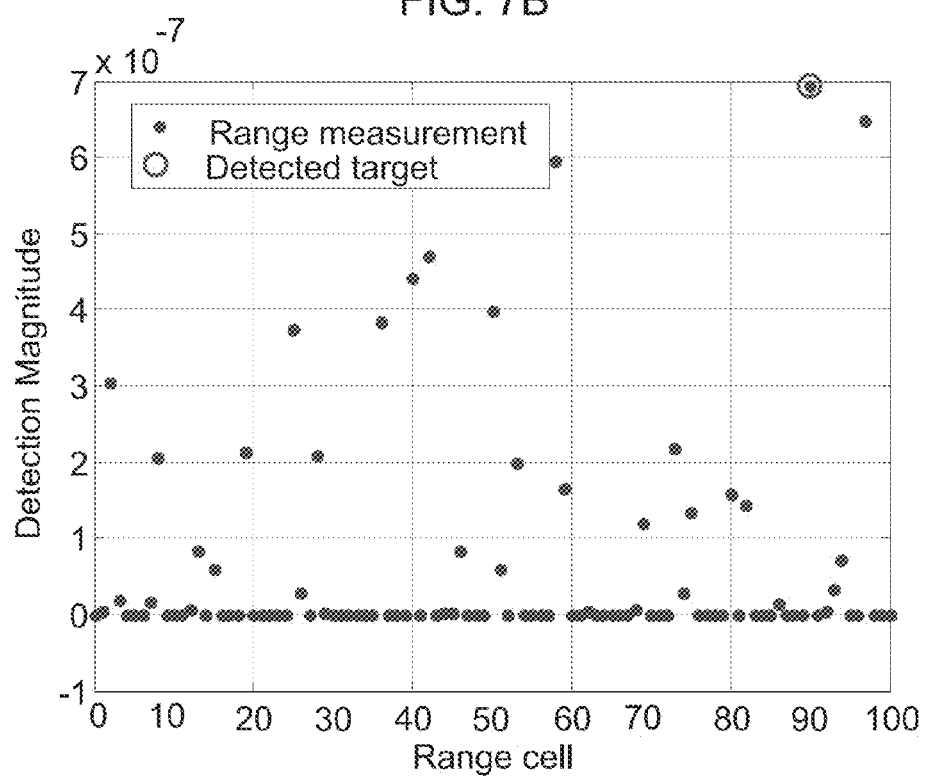
Figure 7D:
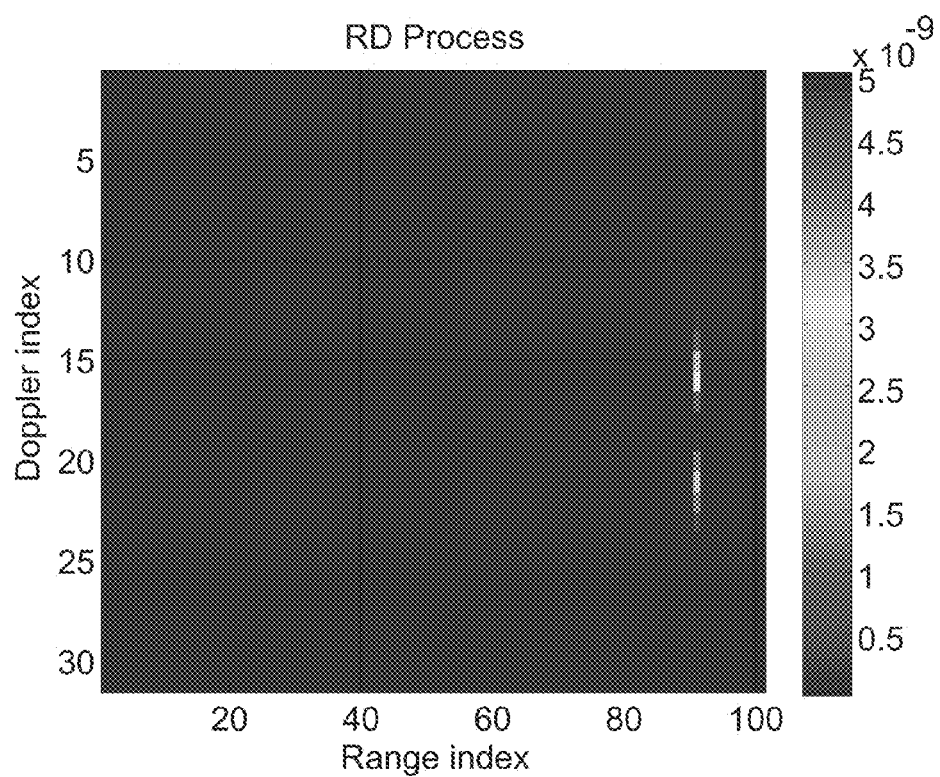
Figure 8A:
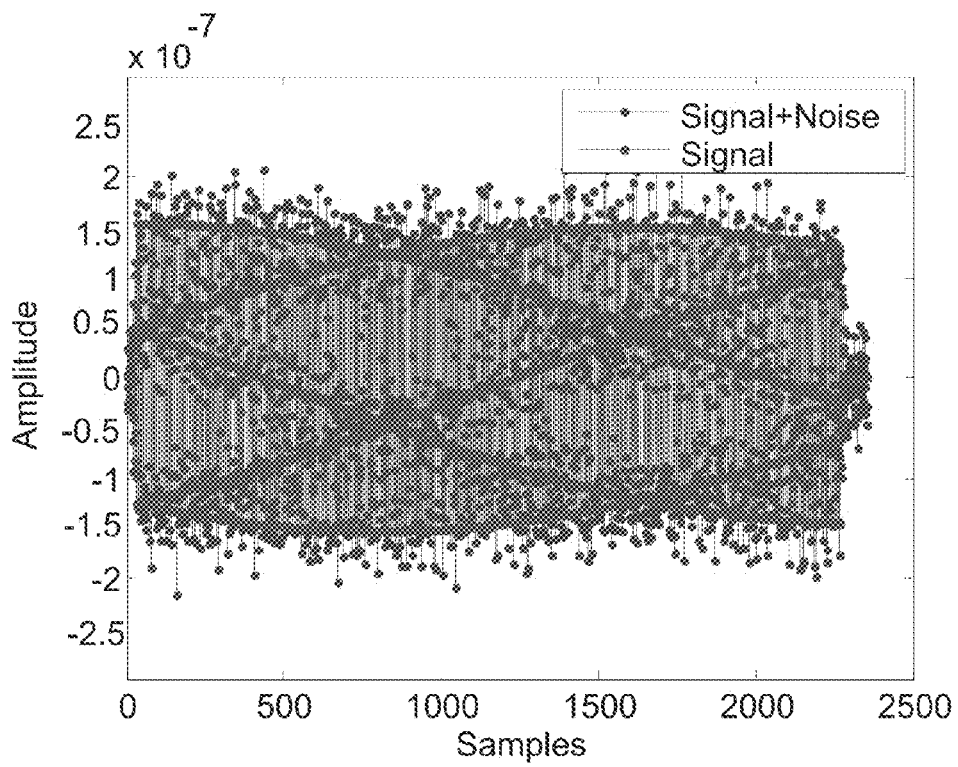
Figure 8B:
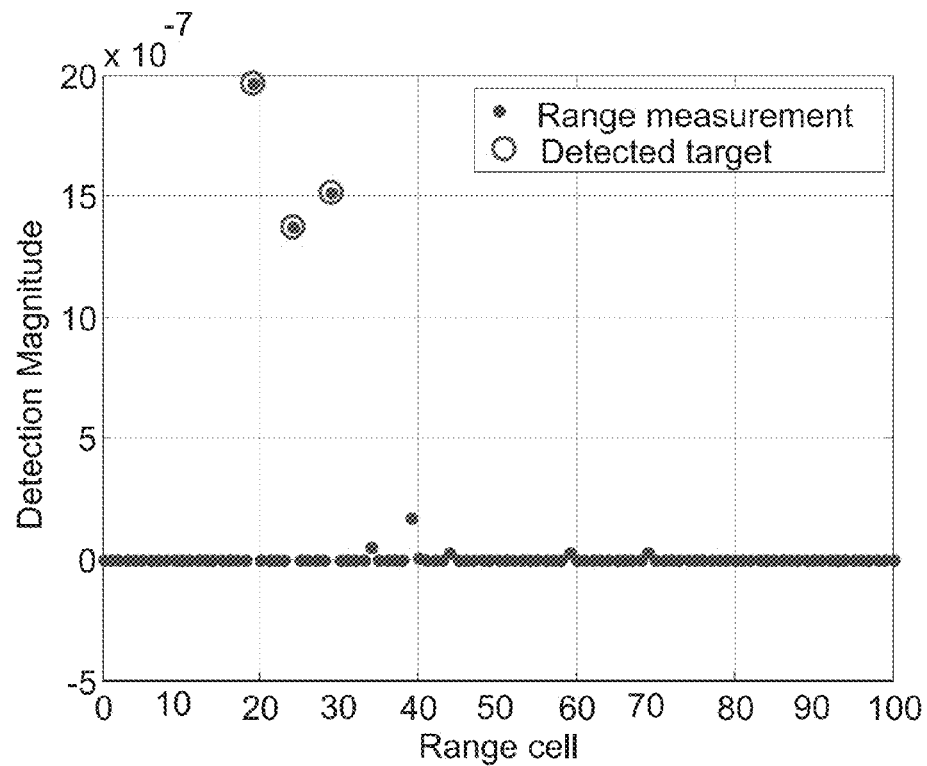
Figure 8C:
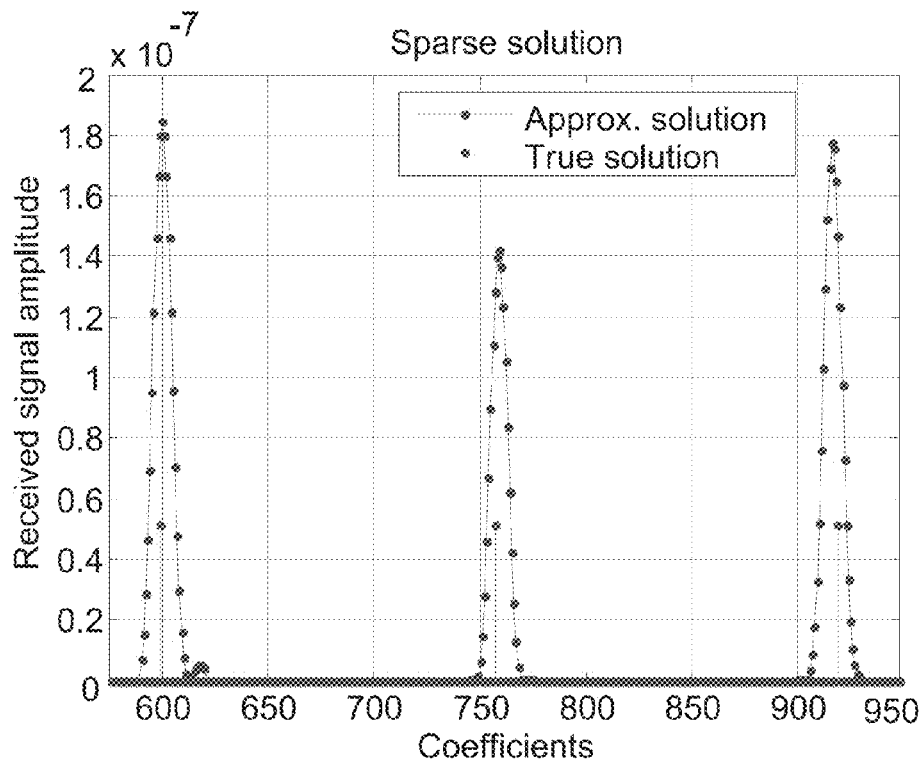
Figure 8D:
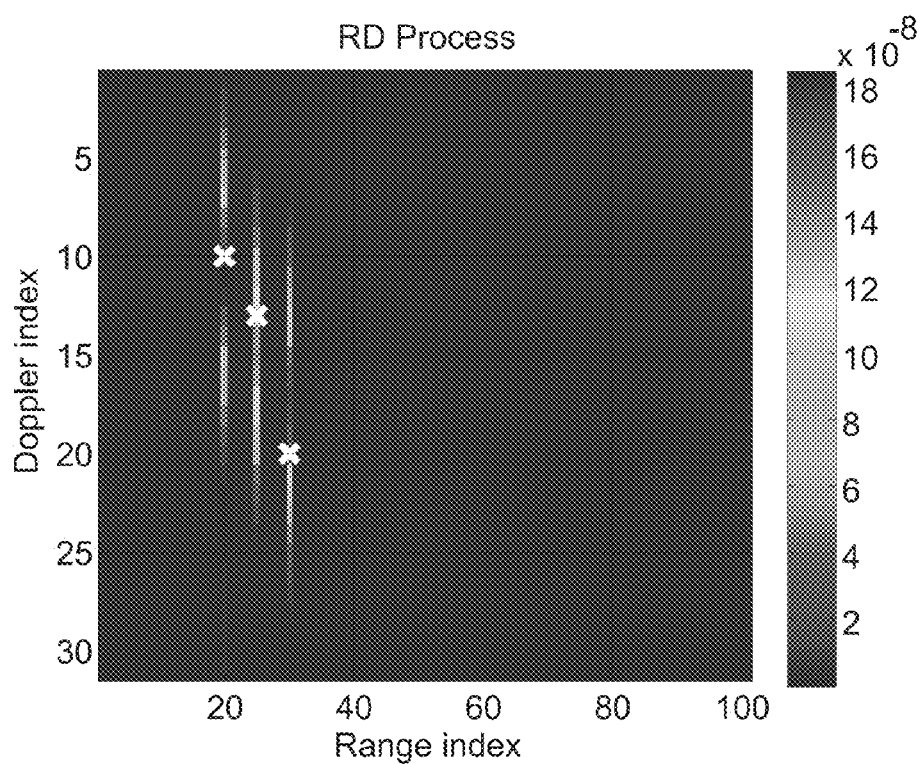

The noise signal is shown in FIG. 7A, and the sparse solution obtained by the optimization algorithm is shown in FIG. 7B in the range-Doppler representation. The range detection process was applied and one of the elements of the vector R that was above the threshold was arbitrarily selected to represent a false positive detection (FIG. 7C). The detected target was then processed in the Doppler component (FIG. 7D). As shown, the falsely detected target has amplitude which is two orders of magnitudes lower than in the case of a physical target. Thus, false detection can be identified by thresholding, wherein target having a coefficient below a predetermined threshold is discarded.

False detection can also be identified by analyzing the statistics of the range coefficients. This can be done, for example, by comparing the distribution of the coefficient of the vector R to a reference distribution characterizing, for example, a signal including only noise, wherein higher level of similarity between the two distributions indicates that the detection is false.

The detection accuracy depends, inter alia, on the pulse width, or equivalently, on the SNR, wherein the detection error is inversely proportional to the SNR.

The analysis presented above with respect to FIGS. 6A-G was repeated for signals with SNR of 3 dB±0.05 dB, using a pulse duration of 30 μs. The corresponding relative reconstruction error $E_{recon}$ was 2.32 (232%) when calculated using only coefficients corresponding to the range and speed as detected, and $6.42 \times 10^6$ when calculated using all non-zero coefficients. The results are shown in FIGS. 8A-D. As shown, the accuracy in range and speed detection was significantly improved.

The analysis was also repeated for less dense data, wherein the range difference between targets are higher. The targets were located in the range and Doppler window in the following configuration: (j, l)=(20, 9), (45, 17) and (80, 25), where the velocity resolution was $\Delta V = 20$ m/s. The corresponding relative reconstruction error $E_{recon}$ was 2.75 (275%) when calculated using only coefficients corresponding to the range and speed as detected, and $6.57 \times 10^6$ when calculated using all non-zero coefficients. The results are shown in FIG. 9, demonstrating detection with high accuracy.

FIGS. 10A and 10B show the results obtained with very dense data (4 m range difference between targets). Specifically, the targets were located in the range and Doppler window in the following configuration: (j, l)=(20, 15), (24, 17) and (28, 22), where the velocity resolution was $\Delta V = 20$ m/s. The SNR was of 3 dB±0.05 dB. The corresponding relative reconstruction error $E_{recon}$ was 2.67 (267%) when calculated using only coefficients corresponding to the range and speed as detected, and $9.77 \times 10^6$ when calculated using all non-zero coefficients. FIGS. 11A and 11B show additional results obtained, using pulse width of 15 µs (SNR=0 dB±0.05 dB, for each target), with very dense data (11 targets, range difference between targets 5 m or 10 m and placed at random on 11 Doppler intervals among 31 Doppler intervals). The corresponding relative reconstruction error $E_{recon}$ was 0.84 (84%) when calculated using only coefficients corresponding to the range and speed as detected, and $1.8 \times 10^6$ when calculated using all non-zero coefficients.

As shown in FIGS. 10A-11B, albeit the Doppler error is relatively high, the range detection is generally accurate.

It was found by the present inventors that when the range differences among targets is small, more accurate speed detection can be achieved using longer pulses. FIGS. 12A-D shows detection results using pulse duration of 300 µs corresponding to SNR of 13 dB±0.05 dB. The data included two targets at the same range but different speeds. Specifically, the targets were located in the range and Doppler window in the following configuration: (j, l)=(30, 10) and (30, 14), where the velocity resolution was ΔV=15 m/s. The corresponding relative reconstruction error $E_{recon}$ was 22.13 (2213%) when calculated using only coefficients corresponding to the range and speed as detected, and $1.17 \times 10^7$ when calculated using all non-zero coefficients. As shown, the procedure accurately detects both the range and the speed, even for such challenging data.

Figure 13A:
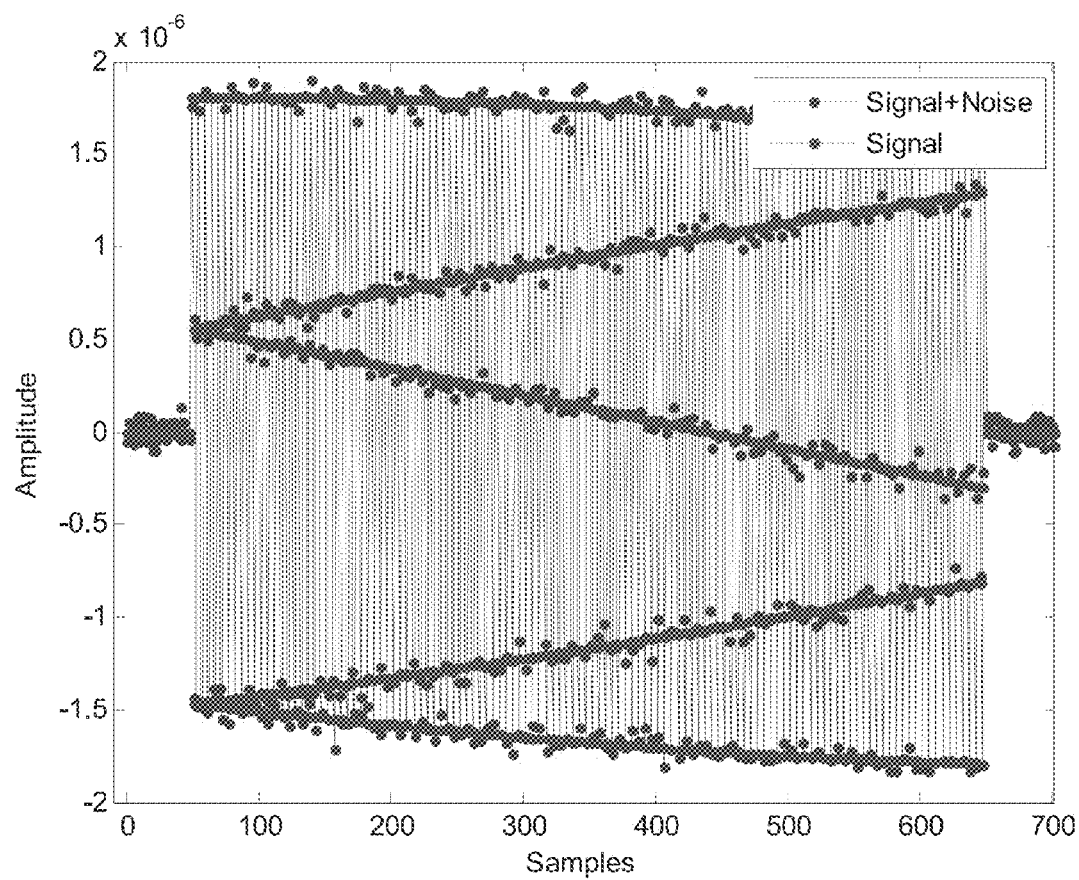
Figure 13B:
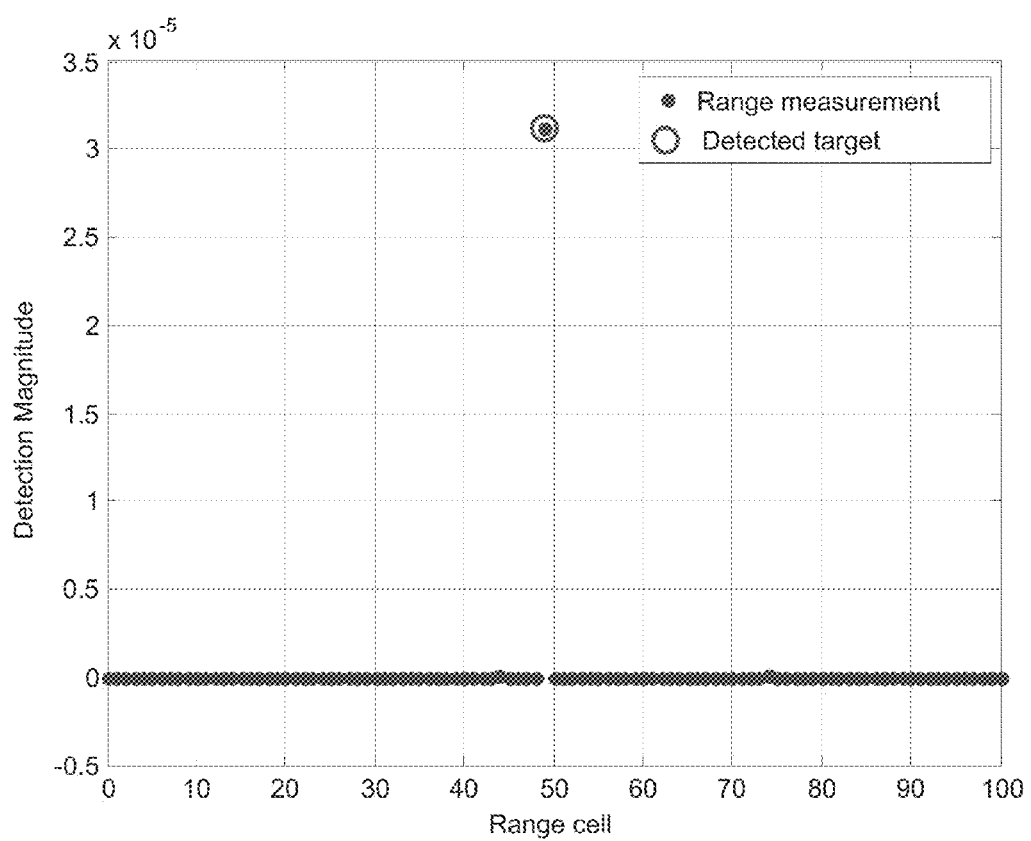
Figure 13C:
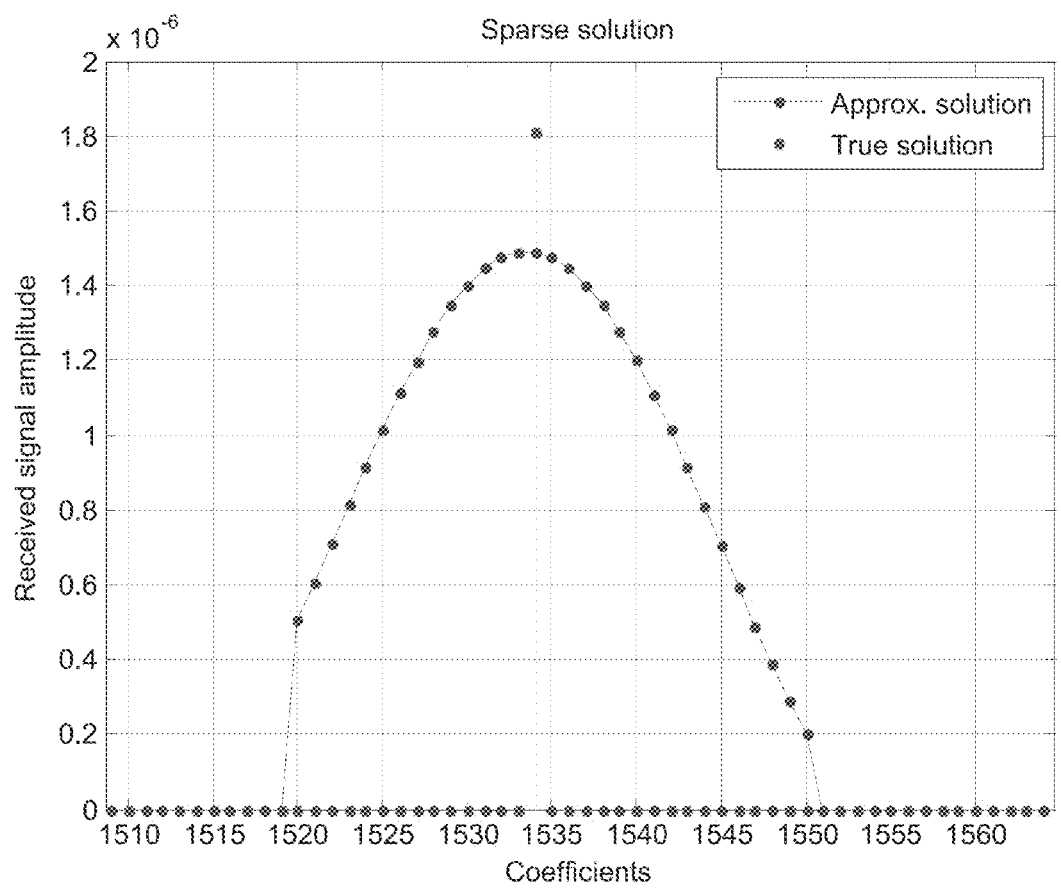
Figure 13D:
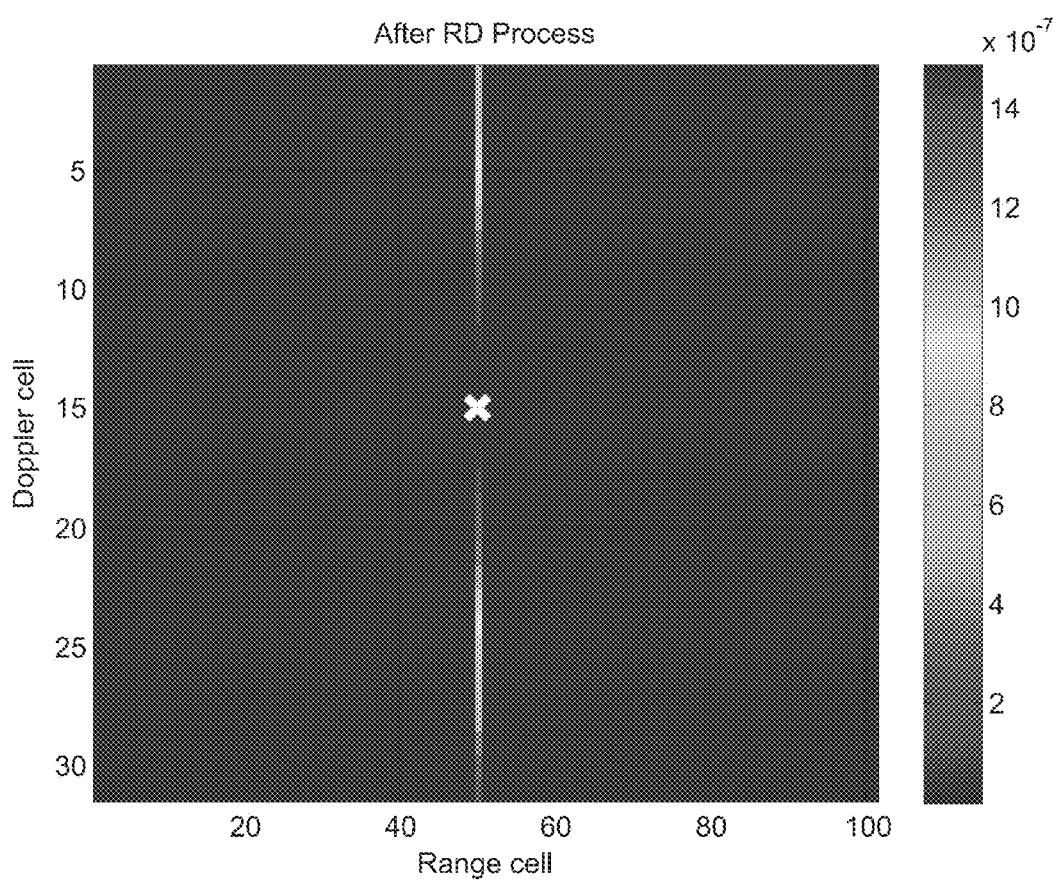

FIGS. 13A-D show results obtained for a pulse duration of 8 µs. The corresponding SNR was 30 dB±0.05 dB, and the signal included echo from a single target located at j=50. In this experiment, the range window was also $R_{Win}$=[10, 10.2]km, but the technique of the present embodiments was employed for the detection of both range and speed. FIG. 13A shows the signal, FIG. 13B shows the resultant range detection vector, FIG. 13C shows the speed detection vector and FIG. 13D shows the detected target on a range-Doppler map. The corresponding relative reconstruction error $E_{recon}$ was 0.17 (17%) when calculated using only coefficients corresponding to the range and speed as detected, and $5.51 \times 10^5$ when calculated using all non-zero coefficients. Without wishing to be bound with any particular theory, it is assumed that relatively low (but still significant) value of $E_{recon}$ is attributed to the relatively short pulse duration.

REFERENCES

[1] Richards, M. A. Fundamentals of Radar Signal Processing, McGraw-Hill. 2005.
[2] Cheney, M. and Borden, B. Fundamentals of Radar Imaging. CBMS-NSF Regional Conferences Series in Applied Mathematics 79. Society for Industrial and Applied Mathematics. PA, USA. 2009.
[3] Barton, D. K. Radar System Analysis and Modeling. Norwood, Mass.: Artech House, 2005.
[4] Peebles, Jr., P. Z. Radar Principles. John Wiley Sons, New York, 1998.
[5] Levanon, N. and Mozenson, E. Radar Signals. John Wiley Sons, New Jersey, 2004.
[6] Shkolnik, M. et al., Radar Handbook. McGraw-Hill, New York, 2008.
[7] M. Bernfeld, C. E. Cook, J. Paolilli, and C. A. Palmieri, "Matched Filtering Pulse Compression and Waveform Design", (four parts), Microwave J. 7, pt. 1, pp. 57-64, October 1964, pt. 2, pp. 65-74, November 1964, pt. 3, pp. 75-81, December 1964, pt. 4, pp. 82-90, January 1965
[8] G. L. Turin, "An Introduction to Matched Filters", IRE Trans., vol. IT-6, pp. 311-329, June 1960
[9] M. Herman, T. Strohmer, High-Resolution Radar via Compressed Sensing, in: IEEE Trans. on Signal Proc, Vol 57, No. 6, June 2009.
[10] Ender, J. H. G., On compressive sensing applied to radar, Signal Processing. Vol. 90, Issue 5, 2010, pp. 1402-1414.
[11] Y. Yu, A. Petropulu and H. V. Poor, MIMO Radar Using Compressive Sampling, IEEE Journal on Selected Topics in Signal Proc., Vol. 4, no. 1, February 2010.
[12] R. Baraniuk and P. Steeghs, "Compressive radar imaging", in Proc. Radar Conf., April 2007, pp. 129-133
[13] L. Potter, E. Ertin, J. Parker, and M. Cetin, Sparsity and compressed sensing in radar imaging, Proceedings of the IEEE, Special Issue on Applications of Compressed Sensing. Vol. 98, no. 6, June 2010.
[14] S. Shah, Y. Yu, and A. Petropulu, Step-Frequency Radar with Compressive Sampling (SFR-CS), in Proc. ICASSP 2010, March 2010.
[16] D. L. Donoho, M. Elad and V. N Temlyakov, "Stable Recovery of Sparse overcomplete representations in the presence of noise", IEEE Trans. Inf. Theory, vol. 52, pp. 6-18, January 2006.
[17] J. A. Tropp, Greed is good: Algorithmic results for sparse approximation, IEEE Trans. Inf. Theory, vol. 50, no. 10, pp. 2231-2242, October 2004.
[18] E. Cand s, J. Romberg, and T. Tao, "Stable signal recovery from incomplete and inaccurate measurements", Commun. Pure. Applied Math., vol. 59, no 8, pp. 1207-1223, 2006.
[19] S. Chen, D. L. Donoho, and M. A. Saunders, "Atomic decomposition by basis pursuit", SIAM J. Sci Comp., vol. 20, no. 1, pp. 33-61, 1999
[20] D. L. Donoho, "Compressed sensing", IEEE Trans. Inf. Theory, vol. 52 pp. 1289-1306, April 2006.
[21] E. Cand s, "Compressive sampling," Proc. of Int. Congress of Math, Madrid, Spain, 2006.
[22] W. O. Alltop, "Complex sequences with low periodic correlations," IEEE Trans. Inf. Theory, vol. 26, no. 3 pp. 350-354, May 1980.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:
1. A method of detecting a physical target in a region-of-interest, comprising:
   by an antenna or antenna array of a radiation transmitting-receiving system, transmitting a pulse of radiation into the region-of-interest, and receiving an echo signal from the region-of-interest;

accessing, by a data processor, a computer readable medium storing a dictionary defined over a plurality of dictionary atoms each describing a dictionary function corresponding to at least a time delay and a Doppler shift;

calculating, by the data processor, a coefficient for each dictionary function using said echo signal, thereby providing a plurality of coefficients, wherein a linear combination of all dictionary functions respectively weighted by said coefficients does not reconstruct said echo signal; and determining, by the data processor, at least one of a range and a speed of the target based on said coefficients, and transmitting a visual output indicative of said determination to a display.

2. The method according to claim 1, further comprising calculating a time delay weight for each time delay, wherein said determining comprises selecting at least one time delay having a time delay weight satisfying a predetermined criterion, and selecting a range value for each selected time delay.

3. The method according to claim 2, wherein said calculating said time delay weight comprises summing over at least a portion of coefficients corresponding to a respective time delay.

4. The method according to claim 2, wherein said determining comprises:

analyzing a subset of dictionary atoms corresponding to said at least one selected time delay;

selecting from said subset at least one dictionary atom having a maximal correlation with said echo signal; and selecting a speed value based on a Doppler shift of each selected dictionary atom.

5. The method according to claim 4, further comprising, for each selected dictionary atom, subjecting a coefficient of said selected dictionary atom to a false detection test, and rejecting or accepting a range value and speed value associated with said selected dictionary atom based on said false detection test.

6. The method according to claim 2, wherein said calculating said Doppler shift weight comprises summing over at least a portion of coefficients corresponding to a respective Doppler shift.

7. The method according to claim 1, further comprising calculating a Doppler shift weight for each Doppler shift, wherein said determining comprises selecting at least one Doppler shift having a Doppler shift weight satisfying a predetermined criterion, and selecting a speed value for each selected Doppler shift.

8. The method according to claim 7, wherein said determining comprises:

analyzing a subset of dictionary atoms corresponding to said at least one selected Doppler shift;

selecting from said subset at least one dictionary atom having a maximal correlation with said echo signal; and selecting a range value based on a time delay of each selected dictionary atom.

9. The method according to claim 1, wherein each dictionary atom describes a dictionary function corresponding to a time delay, a Doppler shift and at least one angle.

10. The method according to claim 9, wherein the method comprises determining at least one angle of the target based on said coefficients.

11. The method according to claim 1, wherein said calculation and said determining is based on an echo signal corresponding to a single transmitted continuous wave pulse.

12. The method according to claim 1, wherein said pulse is a generally rectangular continuous wave pulse of a generally fixed frequency band.

13. The method according to claim 1, wherein said calculation and said determining is based on an echo signal corresponding to a plurality of unsynchronized Frequency Division Multiplexing pulses.

14. The method according to claim 1, further comprising repeating said transmission, said receiving, said calculation and said determination using a pulse having longer duration.

15. The method according to claim 1, further comprising repeating said transmission, said receiving, said accessing, said calculation and said determination at a first repetition rate $N_1$ using pulses having a first duration, and at a at a second repetition rate $N_2$ using pulses having a second duration longer than said first duration, wherein $N_2$ is smaller than $N_1$.

16. The method according to claim 1, wherein a frequency bandwidth characterizing said pulse is less than $c/(2R_{Res})$, where c is a propagation speed of said pulse in the region-of-interest and $R_{Res}$ is a predetermined spatial resolution.

17. The method according to claim 1, wherein a time-on-target characterizing said radiation is less than $1/f_{Res}$, where $f_{Res}$ is a predetermined spectral resolution.

18. The method according to claim 1, further comprising constructing said dictionary.

19. A system for detecting a physical target, the system comprising:

a radiation transmitting-receiving system having an antenna or antenna array configured for transmitting a pulse of radiation into a region-of-interest and for receiving an echo signal from said region-of-interest;

a data processor configured to access a computer readable medium storing a dictionary defined over a plurality of dictionary atoms each describing a dictionary function corresponding to at least a time delay and a Doppler shift, to calculate a coefficient for each dictionary function using said echo signal so as to provide a plurality of coefficients, wherein a linear combination of all dictionary functions respectively weighted by said coefficients does not reconstruct said echo signal, to determine at least one of a range and a speed of the target based on said coefficients and to generate an output indicative of said determination; and a display device for displaying a visual output indicative of said determination.

20. The system according to claim 19, wherein said data processor is configured to calculate a time delay weight for each time delay, to select at least one time delay having a time delay weight satisfying a predetermined criterion, and to select a range value for each selected time delay.

21. The system according to claim 20, wherein said data processor is configured to calculate said Doppler shift weight by summing over at least a portion of coefficients corresponding to a respective Doppler shift.

22. The system according to claim 19, wherein said data processor is configured to calculate a Doppler shift weight for each Doppler shift, to select at least one Doppler shift having a Doppler shift weight satisfying a predetermined criterion, and to select a speed value for each selected Doppler shift.

* * * * *